(12) United States Patent
Kobayashi

(10) Patent No.: US 8,764,197 B2
(45) Date of Patent: Jul. 1, 2014

(54) POLARIZATION CONVERSION ELEMENT, POLARIZATION CONVERTING UNIT, AND PROJECTING APPARATUS

(75) Inventor: Shuho Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 13/439,136

(22) Filed: Apr. 4, 2012

(65) Prior Publication Data

US 2012/0268718 A1    Oct. 25, 2012

(30) Foreign Application Priority Data

Apr. 20, 2011 (JP) ................................ 2011-093779

(51) Int. Cl.
*G03B 21/00* (2006.01)

(52) U.S. Cl.
USPC ........ 353/8; 353/20; 353/31; 353/84; 353/85; 353/99; 359/485.03; 359/485.05; 349/7; 349/9

(58) Field of Classification Search
USPC .................. 353/8, 20, 30, 31, 32, 38, 84, 85, 353/98–99; 359/485.03, 485.04, 485.05, 359/485.06, 563, 566, 619, 626; 349/5, 349/7–9, 78, 194, 201, 202; 348/744–747, 348/752, 762
See application file for complete search history.

(56) References Cited

U.S. PATENT DOCUMENTS

| | | | | |
|---|---|---|---|---|
| 6,811,262 B2 * | 11/2004 | Takezawa et al. | ............... | 353/20 |
| 7,011,412 B2 * | 3/2006 | Ogawa et al. | .................... | 353/20 |
| 7,086,737 B2 * | 8/2006 | Kitabayashi | ..................... | 353/31 |
| 7,130,120 B2 * | 10/2006 | Katsumata et al. | ....... | 359/485.04 |
| 7,764,354 B2 * | 7/2010 | Ooi et al. | ....................... | 349/194 |
| 8,031,401 B2 * | 10/2011 | Oto | ........................... | 359/489.07 |
| 8,186,832 B2 * | 5/2012 | Hayashi et al. | ................. | 353/20 |
| 2011/0187999 A1 * | 8/2011 | Hirata et al. | .................... | 353/20 |

FOREIGN PATENT DOCUMENTS

| | | |
|---|---|---|
| JP | A-58-189605 | 11/1983 |
| JP | A-58-194004 | 11/1983 |
| JP | A-58-203404 | 11/1983 |
| JP | A-59-62807 | 4/1984 |
| JP | A-2000-298212 | 10/2000 |
| JP | A-2002-139703 | 5/2002 |
| JP | B2-3309846 | 7/2002 |
| JP | A-2009-103863 | 5/2009 |
| JP | B2-4329852 | 9/2009 |
| JP | A-2010-107912 | 5/2010 |

* cited by examiner

*Primary Examiner* — Sultan Chowdhury
(74) *Attorney, Agent, or Firm* — Oliff PLC

(57) ABSTRACT

In a polarization conversion element including a plurality of light transmitting substrates and an optical element that includes polarization splitting films and reflective films that are alternately disposed between the light transmitting substrates, and a laminated wave plate that is arranged on the light outgoing face of the optical element and rotates the polarization plane of light emitted from the optical element by θ, a laminated wave plate is acquired by stacking a first wave plate of a phase difference Γ1 for light of a wavelength λ and a second wave plate of a phase difference of Γ2 such that the optical axes thereof intersect each other, the relationship is "|Γ1−Γ2|=180 (degrees), and the azimuth of the optical axis of the first wave plate and the azimuth of the optical axis of the second wave plate are perpendicular to each other.

18 Claims, 20 Drawing Sheets

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

FIG. 16
EXAMPLE 2
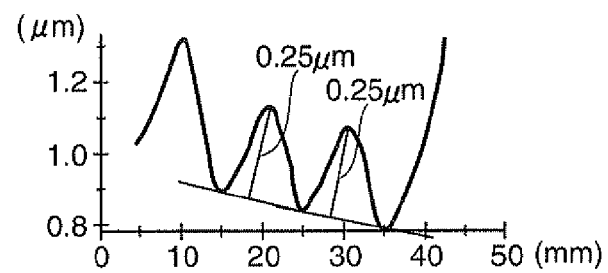
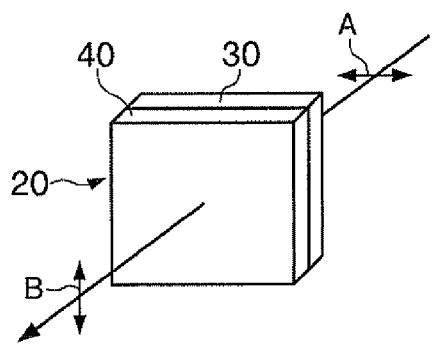
FIG. 17A
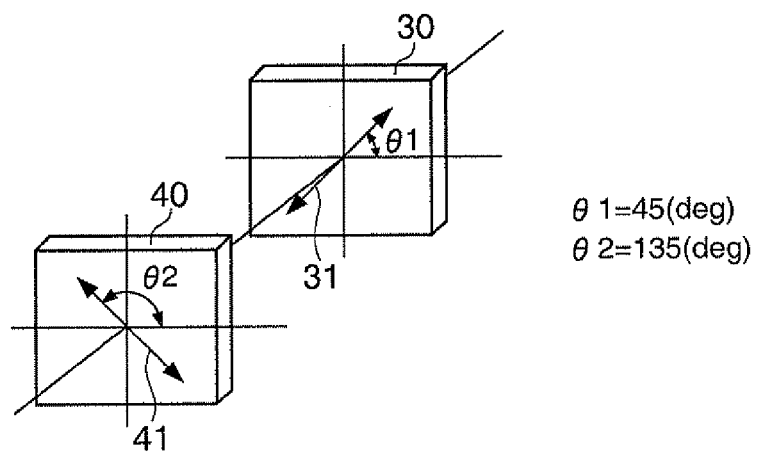
$\theta 1 = 45 \text{(deg)}$
$\theta 2 = 135 \text{(deg)}$
FIG. 17B

POLARIZATION CONVERSION ELEMENT, POLARIZATION CONVERTING UNIT, AND PROJECTING APPARATUS

BACKGROUND

1. Technical Field

The present invention relates to a polarization conversion element that is used for converting randomly-polarized light beams emitted from a light source into one type of a polarized light beam.

2. Related Art

Projection-type video systems (projection apparatuses) such as liquid crystal projectors are devices that modulate light emitted from a light source device in accordance with image information and project a modulated optical image onto a screen in an enlarged scale.

In such projection apparatuses, in order to improve the use efficiency of light, polarization conversion elements are used for splitting light (hereinafter, referred to as random light) including randomly-polarized light beams (polarized light beams such as a P-polarized light beam and an S-polarized light beam of which the polarization planes are perpendicular to each other, light beams in which linearly polarized light beams of which the directions of polarization planes are various are mixed, circularly-polarized light beams, and elliptically-polarized light beams) emitted from a light source device into a plurality of intermediate light beams, converting the split intermediate light beams into one type of linearly-polarized light, and uniformly outputting the linearly-polarized light.

Generally, such polarization conversion elements have structures disclosed in JP-A-2000-298212 and Japanese Patent No. 3309846.

Such a polarization conversion element, generally, has a configuration in which a ½ wave plate formed from an organic material such as a polycarbonate film is bonded to an outgoing-side surface of a polarizing beam splitter (PBS) array (prism array) using an organic adhesive, which is acquired by generating a laminated body, in which a PBS film (an optical functional film a so-called polarizing splitting film having a function of transmitting one linearly-polarized light beam of the P-polarized light beam and the S-polarized light beam having an orthogonal relation and reflecting the other linearly-polarized light beam) and a reflective mirror film are formed on both principal surfaces, acquired by alternately stacking multiple light transmitting substrates such as colorless transparent glasses and cutting the laminated body at a predetermined angle, for example, 45 (degrees) (or 135 (degrees) with respect to the incident face (stacking face). Thus, random light emitted from the light source is selectively incident to the PBS film due to a light shielding plate arranged on the optical path, and is split into an S-polarized light beam and a P-polarized light beam, and, for example, the P-polarized light beam is transmitted through the PBS film, and the S-polarized light beam is reflected by the PBS film.

When the P-polarized light beam transmitted through the PBS film is incident to the ½ wave plate, the phase of the P-polarized light beam is shifted by 180 (degrees) so as to be converted into an S-polarized light beam and incident from the ½ wave plate. In addition, the S-polarized light beam reflected by the PBS film is further reflected by the reflective mirror film so as to be output from an outgoing face located in an area of the PBS array in which the ½ wave plate is not arranged.

As a result, the light output from the polarization conversion element is uniformized as S-polarized light.

In contrast to the above-described case, it may be configured such that the PBS film transmits the S-polarized light beam and reflects the P-polarized light beam, the S-polarized light beam transmitted through the PBS film is converted into the P-polarized light beam through the ½ wave plate, and the P-polarized light beam reflected by the PBS film is reflected by the reflective mirror film so as to be output from the outgoing face of the PBS array in which the ½ wave plate is not arranged, whereby the light output from the polarization conversion element is uniformized as the P-polarized light.

FIG. 29 is a diagram illustrating the configuration of a general polarization conversion element.

A light transmitting substrate 98 in which a polarization splitting film 91 and a reflective (mirror) film 92 are formed and a light transmitting substrate 98 in which such films are not formed are alternately bonded together through an adhesive layer 93, the bonded laminated body is cut at a predetermined angle, for example, 45 degrees (or 135 degrees), the cut face is ground, and a phase difference plate 97 is bonded to an element main body 95, in which a light incident surface 951 and a light outgoing surface 952 are formed, through an adhesive layer 96.

Recently, in a white light source lamp as a light source used in a liquid crystal projector that uses the polarization conversion element having the above-described configuration, implementation of a high output and a short arc length has progressed, and the thermal load of the PBS array and the ½ wave plate described above has been increased.

Thus, in Japanese Patent No. 4329852, a polarization converting unit has been proposed in which a plurality of phase difference plates that are formed by using quartz crystal members and convert the polarization axis of one of linearly-polarized light beams separated by a polarization separating film into the polarization axis of the other is arranged on a light beam output side of the polarization separating element array in the polarization separating element array through a spacer member having a predetermined thickness. In addition, it is described that the spacer is configured as a double-sided tape such that the spacer member can be directly bonded to an attachment object.

However, there are problems in that an adhesive (the adhesive layer 93) that is generally used for stacking and bonding a light transmitting substrate 98 when the polarization conversion element as shown in FIG. 29 is configured does not respond to high-luminance lamp light and is degraded so as to decrease the transmittance of light.

As the reasons for the problems, the following and the like may be considered. An adhesive that is generally used is composed of a component having high absorptivity for short-wavelength light. The viscosity of the adhesive is high, and thus the coating amount thereof is large so as to thicken the adhesive layer 93, whereby the amount of absorbed light is large. In addition, the adhesive is composed of a component that has a low decomposition temperature.

In addition, in the general polarization conversion element shown in FIG. 29, the adhesive layer 93 is thickened as described above, and, in a case where the laminated body is cut in the state in which the adhesive layer 93 is thickened, distortions occur in the end portions of the adhesive layer 93. When the cut face is ground in the state in which the distortions occur, as shown in FIG. 30, the corners 981 of the light transmitting substrate 98 near the adhesive layer 93 are removed. Accordingly, a gap is generated in the adhesive layer 96 used for bonding the phase difference plate 97 to the element main body 95, and there are problems in that the phase difference plate 97 may be easily peeled off, and air bubbles 961 may be formed so as to decrease the light transmittance.

Furthermore, by removing the corners 981 of the light transmitting substrate 98 near the adhesive layer 93, there is an additional problem in that an area through which light is effectively transmitted is decreased.

Regarding such problems, in JP-A-2002-139703, in an example of a wave plate that is configured by a first wave plate and a second wave plate, a configuration is disclosed in which the first and second wave plates are not stacked but arranged to be spatially separated from each other. By applying such a configuration to the polarization conversion element, light transmitting substrates configuring the polarization conversion element can be arranged so as to be separated from each other without using an adhesive, whereby the effect of degradation of the optical characteristics of the polarization conversion element due to degradation of the adhesive or removal of the corners of the light transmitting substrate at the time of grinding can be avoided. However, in such a case, there are problems of complexity or a high cost in the manufacturing process, an increase in size of the optical element, and the like due to control of the intersection angle of optical axes of the light transmitting substrates, arrangement of an anti-reflective film formed on the front and rear faces of each wave plate, and the like, which is not desirable.

Furthermore, as a ½ wave plate (phase difference plate) used in the polarization conversion element described as above, a ½ wave plate having specifications in which a phase difference is 180 (degrees) for light of a predetermined wavelength, the polarization converting efficiency is one, and P-polarized light beam can be reliably converted into S-polarized light, or the S-polarized light beam can be reliably converted into a P polarized light beam is demanded, so that it can be applied to a liquid crystal projector that uses three wavelength bands of R, G, and B as three primary colors of light.

In addition, it is additionally required that the ½ wave plate reliably shows optical characteristics in the range of 0±10 (degrees) from the incidence angle of 0±3 (degrees) of light that is incident to the polarization conversion element.

SUMMARY

An advantage of some aspects of the invention is that it realizes the structure of a polarization conversion element including a wave plate that reliably serves as a ½ wave plate for incidence light by using an ultraviolet-curing resin adhesive having superior heat resistance and light resistance as an adhesive.

Application Example 1

This application example is directed to a polarization conversion element that has a light incident face and a light outgoing face that are approximately parallel to each other. The polarization conversion element includes: a plurality of light transmitting substrates that are joined together through an adhesive layer by a joining face having a predetermined tilt angle with respect to the light incident face or the light outgoing face; an optical element that is alternately disposed in boundary portions between the plurality of light transmitting substrates and includes polarization splitting portions that split light incident to the light incident face into two mutually-different types of linearly-polarized light beams of which polarization directions are perpendicular to each other, transmit one linearly-polarized light beam, and reflect the other linearly-polarized light beam and reflective portions that change a direction of an optical path by reflecting the other linearly-polarized light beam that is reflected; and a phase difference plate that is arranged on the light outgoing face, converts any one of the two types of linearly-polarized light beams into a linearly-polarized light beam parallel to a polarization plane of the other linearly-polarized light beam by rotating a polarization plane of the one linearly-polarized light beam, and outputs the converted linearly-polarized light beam. The adhesive layer is an ultraviolet-curing type adhesive having a thickness equal to or larger than 5 µm and equal to or less than 10 µm, the phase difference plate is a phase difference plate that is arranged in an area located above the polarization splitting portion or an area located above the reflective portion on the light outgoing face, is formed by stacking a first wave plate of a phase difference $\Gamma 1$ for light of a wavelength $\lambda$ and a second wave plate of a phase difference $\Gamma 2$ for light of a wavelength $\lambda$ such that optical axes of the first and second wave plates intersect each other, converts an incident linearly-polarized light beam into a linearly-polarized light beam acquired by rotating the polarization plane of the incident linearly-polarized light beam by a rotation angle $\theta = 90$ (degrees), and outputs the converted linearly-polarized light beam, a relationship between the phase difference $\Gamma 1$ and the phase difference $\Gamma 2$ satisfies "$|\Gamma 1 - \Gamma 2| = 180$ (degrees)", and an azimuth $\theta 1$ of the optical axis of the first wave plate and an azimuth $\theta 2$ of the optical axis of the second wave plate are perpendicular to each other and satisfy $\theta 1 = 45$ (degrees) and $\theta 2 = 135$ (degrees) or $\theta 1 = 135$ (degrees) and $\theta 2 = 45$ (degrees).

According to this application example, by using an ultraviolet-curing type resin adhesive having superior heat resistance and superior light resistance as an adhesive used when the optical element is produced, the polarization conversion element has high heat resistance and high light resistance. In addition, by setting the azimuths of optical axes and the phase differences as described above, the structure of the polarization conversion element can be realized which includes a phase difference plate that reliably serves as a ½ wave plate for light of a predetermined wavelength band and has superior incidence angle dependency.

Furthermore, the thickness of the bonding layer is equal to or less than 10 µm and is sufficiently small, and accordingly, the corners of the light transmitting substrates are not removed when the light incident face and the like are ground. Accordingly, there is no problem of narrowing the light transmitting area.

Application Example 2

This application example is directed to the polarization conversion element according to Application Example 1, wherein the phase difference plate includes: a base portion that is joined to an end edge portion of the optical element in a direction in which the polarization splitting films and the reflective films are alternately aligned; and a plurality of phase difference portion main bodies that are formed to be continuous from the base portion and are arranged on the light outgoing face side of the polarization splitting film or the reflective film.

According to this application example, since the phase difference portion main body configuring the phase difference plate is not directly joined to the optical element, it is not necessary to use an adhesive for joining the phase difference portion main body and the optical element. Accordingly, degradation of the optical characteristics due to degradation of the adhesive can be prevented.

Application Example 3

This application example is directed to the polarization conversion element according to Application Example 1 or 2, wherein the adhesive layer has modified acrylate or modified methacrylate as its main component.

According to this application example, by using an ultraviolet-curing type resin adhesive having superior heat resistance and light resistance for bonding the light transmitting substrates, the polarization conversion element has high heat-resistance and high light-resistance so as to have a long life span.

Application Example 4

This application example is directed to the polarization conversion element according to any one of Application Examples 1 to 3, wherein the phase difference plate and the light outgoing face are joined together through a joining layer, the joining layer includes Si frameworks having an atomic structure that includes a siloxane bond (Si—O) and a leaving group that is bound to the Si framework, and, out of the Si frameworks, a free bond of the Si framework from which the leaving group departs becomes an active bond and joins the phase difference plate and the light outgoing face.

According to this application example, since the light transmitting substrate and the phase difference plate are joined together in an inorganic manner, the polarization conversion element has high heat-resistance and high light-resistance so as to have a long life span without the adhesive being degraded due to heat.

Application Example 5

This application example is directed to the polarization conversion element according to any one of Application Examples 1 to 3, wherein the light transmitting substrate and the phase difference plate are joined together through a joining layer, and the joining layer is formed by using an atomic diffusion joining method in which atomic diffusion is caused on a contact boundary face and a grain boundary of a microcrystalline continuous thin film of the light transmitting substrate and a microcrystalline continuous thin film of the phase difference plate by bringing the microcrystalline continuous thin film disposed on the light transmitting substrate and the microcrystalline continuous thin film disposed on the phase difference plate into contact with each other or an atomic diffusion joining method in which atomic diffusion is caused on a contact boundary face and a grain boundary of a microcrystalline continuous thin film and a microcrystalline structure by bringing the microcrystalline continuous thin film disposed on one of the light transmitting substrate and the phase difference plate and the microcrystalline structure disposed on the other into contact with each other.

According to this application example, since the light transmitting substrate and the phase difference plate are joined together in an inorganic manner, the polarization conversion element has high heat-resistance and high light-resistance so as to have a long life span without the adhesive being degraded due to heat.

Application Example 6

This application example is directed to the polarization conversion element according to any one of Application Examples 1 to 5, wherein the material of the phase difference plate is an inorganic optical crystal.

According to this application example, by using an inorganic optical crystal having a high heat dissipating property as the phase difference plate, the phase difference plate has high heat-resistance and high light-resistance so as to have a long life span.

Application Example 7

This application example is directed to a polarization conversion unit including: the polarization conversion element according to any one of Application Examples 1 to 6; and a lens array that is arranged on the light incident side of the polarization conversion element.

According to this application example, by including the above-described polarization conversion element, a polarization conversion unit that has a long life span and has superior optical characteristics can be acquired.

Application Example 8

This application example is directed to a polarization conversion unit including: alight source device that emits light; the polarization conversion unit according to Application Example 7 that converts light emitted from the light source device into one type of polarized light beam; an optical modulation device that forms an optical image in correspondence with image information using the polarized light beam output from the polarization conversion unit; and a projection optical device that projects the optical image formed by the optical modulation device in an enlarged scale.

According to this application example, by using the above-described polarization conversion element, a projection apparatus that has a long life span and has superior optical characteristics can be acquired.

BRIEF DESCRIPTION OF THE DRAWINGS

The invention will be described with reference to the accompanying drawings, wherein like numbers reference like elements.

FIG. 16 is a diagram showing a result of a flatness test for a comparative example.

FIGS. 17A and 17B are diagrams showing the configuration of a high-order mode laminated ½ wave plate.

FIGS. 22A and 223 are diagrams showing the conversion efficiency of the laminated ½ wave plate for the range of 400 nm to 700 nm.

DESCRIPTION OF EXEMPLARY
EMBODIMENTS

Hereinafter, exemplary embodiments of the invention will be described in detail with reference to the drawings.

Figure 1:
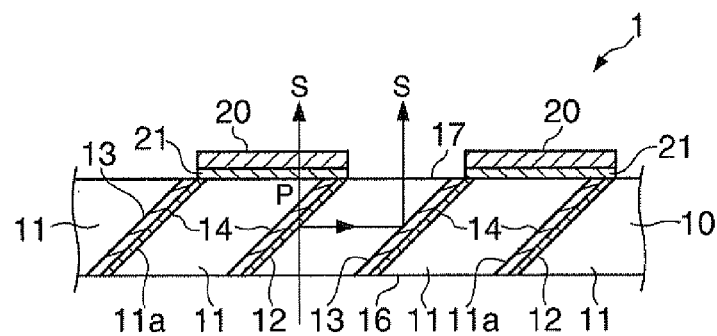
FIG. 1 is a diagram showing an example of a polarization conversion element according to a first embodiment of the invention.

FIG. 1 is a diagram showing an example of a polarization conversion element according to a first embodiment of the invention.

As shown in FIG. 1, the polarization conversion element 1 according to this embodiment of the invention includes an element main body (optical element) 10 as the above-described PBS array and a phase difference plate (laminated ½ wave plate) 20 that is selectively bonded to the element main body 10 and is formed from an inorganic optical crystal such as a quartz crystal.

The inorganic optical crystal such as a quartz crystal has superior thermal conductivity. Thus, compared to a phase plate, which has been described in the background, manufactured by using an organic material, the above-described phase difference plate has superior thermal resistance, and there is no concern about degradation of optical characteristics thereof due to a high temperature.

In addition, as the material of the phase difference plate, lithium tantalate, sapphire, or the like other than the quartz crystal can be used.

Figure 25:
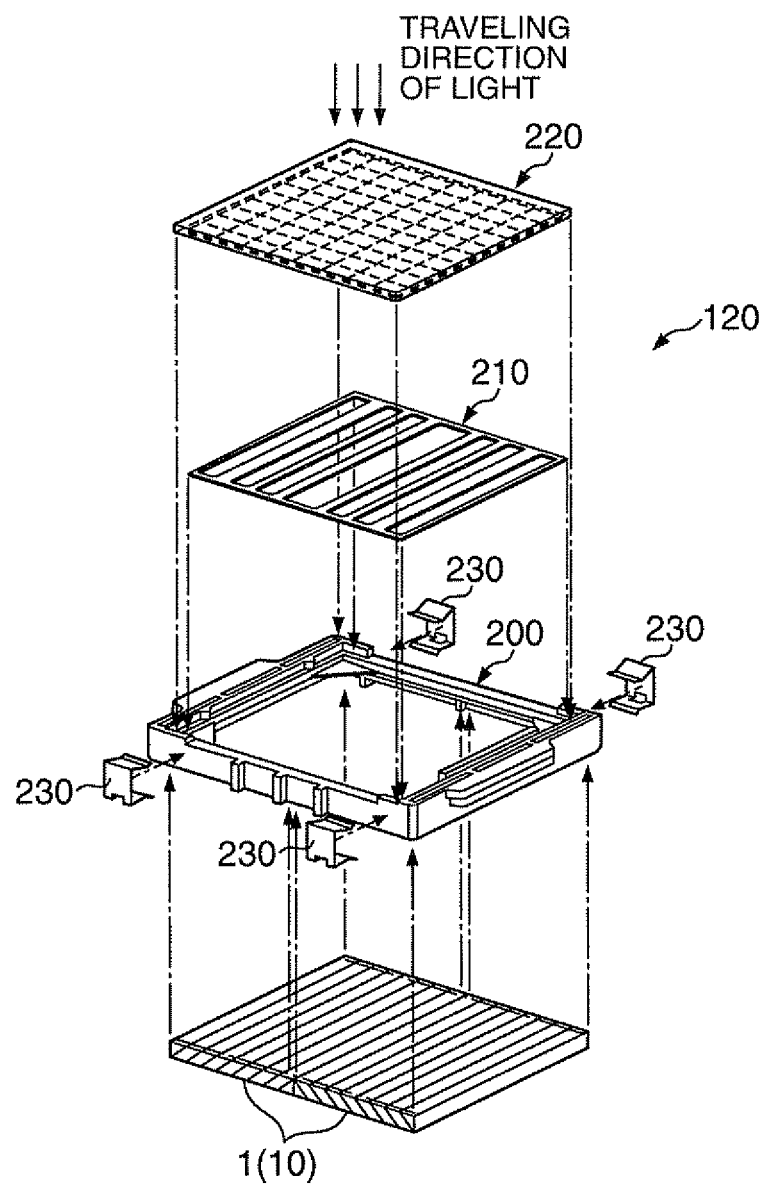
FIG. 25 is an exploded perspective view of the polarization conversion unit shown in FIGS. 24A to 24C.

Furthermore, as shown in FIG. 25 to be described later, although two element main bodies 10 are built in the polarization conversion element 1 while being connected to each other, only a part thereof is displayed in FIG. 1.

As shown in FIG. 1, the element main body 10 includes a plurality of light transmitting substrates 11, polarization splitting films (polarization splitting portions) 12 and reflective films (reflective portions) 13 that are alternately disposed between the plurality of light transmitting substrates 11, and adhesive layers 14 that are disposed between the plurality of light transmitting substrates 11 and bond the light transmitting substrates 11 together.

In addition, the element main body 10 includes a light incident face 16 and a light outgoing face 17 that are approximately parallel to each other.

Furthermore, in the element main body 10, the plurality of light transmitting substrates 11 are bonded together by the adhesive layers 14 with the polarization splitting film (polarization splitting portion) 12 and the reflective film (reflective portion) 13 alternately interposed therebetween using bonding faces 11a that have a predetermined tilt angle with respect to the light incident face 16 or the light outgoing face 17.

The polarization splitting film 12 selectively transmits a P-polarized light beam of input light (an S-polarized light beam and a P-polarized light beam) input from the outside and reflects the S-polarized light.

The reflective film 13 reflects the S-polarized light, which is reflected by the polarization splitting film 12, toward the light outgoing face 17.

Here, the thickness of the adhesive layer 14 is equal to or more than 5 μm and equal to or less than 10 μm.

Since the adhesive layer 14 is formed by using an ultraviolet-curing type adhesive that has modified acrylate or modified methacrylate as its main component, it can be formed to have the above-described thickness.

In a general ultraviolet-curing type adhesive, modified acrylate or modified methacrylate is not used as its main component, and accordingly, the viscosity is high, and the thickness of the adhesive layer is equal to or more than 10 μm and is equal to or less than 20 μm.

In a case where the thickness of the adhesive layer exceeds 10 μm, in the process of manufacturing a polarization converting element to be described with reference to FIGS. 6 to 12, deformation occurs in the end portion of the adhesive layer. Accordingly, when the light incident face 16 and the light outgoing face 17 are ground (FIG. 12), the corners of the light transmitting substrate 11, which are near the deformation, are removed. As a result, when the phase difference plate 20 is bonded to the light outgoing face 17 of the light transmitting substrate 11, a gap is formed between the light transmitting substrate 11 and the phase difference plate 20 so as to generate air bubbles.

Accordingly, the light transmitting substrate 11 and the phase difference plate 20 are not sufficiently bonded to each other, and the phase difference plate 20 can be easily peeled off.

In addition, the light transmittance decreases due to the air bubbles generated between the light transmitting substrate 11 and the phase difference plate 20.

On the other hand, in a case where the thickness of the adhesive layer is less than 5 μm, when a foreign material or the like is mixed in the adhesive layer, the bonding strength of the bonding layer decreases due to the foreign material or the like.

However, in a case where the thickness of the adhesive layer is equal to or more than 5 μm and is equal to or less than 10 μm, it is difficult to remove the corners of the light transmitting substrate 11, and accordingly, air bubbles are not generated, and easiness in the peel-off of the phase difference plate 20 from the light transmitting substrate 11 and a decrease in light transmittance can be resolved.

As examples of the adhesive used in this embodiment, there are UT20, HR54 (product name; manufactured by Adell Corp.), and the like.

As shown in FIG. 1, the phase difference plate 20 is bonded to the light outgoing face 17 of the light transmitting substrate 11 above the polarization splitting film 12 by the bonding layer 21.

The phase difference plate 20 is a ½ wave plate manufactured by using a quartz crystal as described above and converts the P-polarized light beam transmitted through the polarization splitting film 12 into S-polarized light.

However, in a case where the polarization converting element 1 uniformly outputs P-polarized light, the phase difference plate 20 is disposed above the reflective film 13.

Here, the bonding layer 21 is a plasma polymerized film that is formed through a molecular junction, and the main material thereof is polyorganosiloxane. The plasma polymerized film is formed by using a plasma polymerization method so as to include a siloxane bond and includes a Si framework of which the degree of crystallization is 45% or less and a leaving group that is formed from an organic group combined with the Si framework. By applying energy so as to allow the leaving group present near the surface to leave the Si framework, the adhesiveness is realized.

Figure 2A:
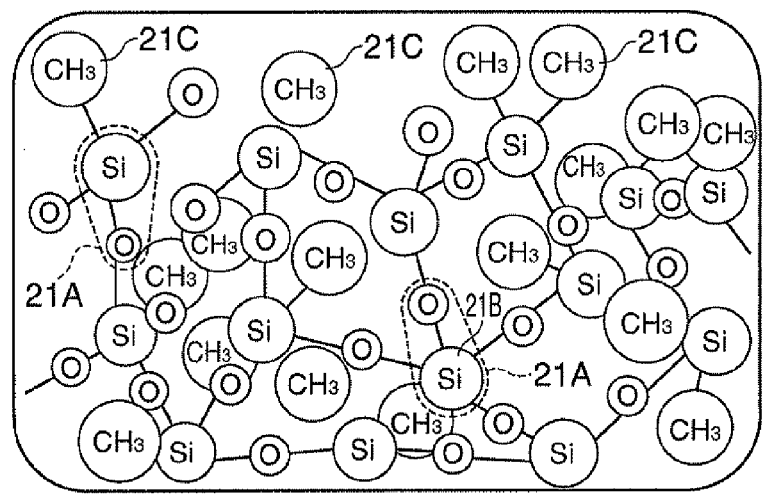
FIGS. 2A and 2B are schematic diagrams illustrating the composition of a plasma-polymerized film.
Figure 2B:
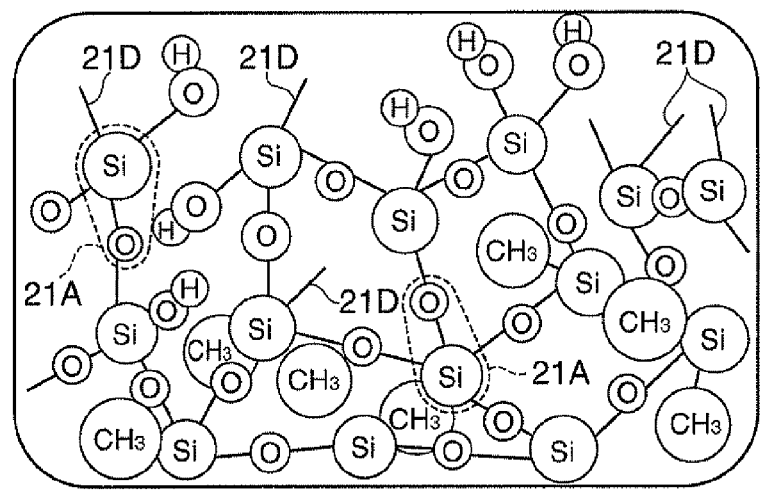

FIGS. 2A and 2B are schematic diagrams illustrating the composition of a plasma-polymerized film. FIG. 2A illustrates the composition before energy is applied, and FIG. 2B illustrates the composition after the energy is applied.

As described above, as shown in FIG. 2A, the plasma polymerized film includes a siloxane bond (Si—O) 21A including a Si framework 21B and a leaving group 12C that is bonded with the Si framework 21B.

When energy is applied to the bonding layer 21 that is formed from a plasma polymerized film as shown in FIG. 2A, as shown in FIG. 2B, the leaving group 21C shown in FIG. 2A is detached from the Si framework 215. Accordingly, an active bond 21D is developed on the surface and the inside of the bonding layer 21 so as to be activated.

As a result, the adhesiveness is implemented on the surface of the bonding layer 21. When the adhesiveness is implemented, the bonding layer 21 can be firmly bonded. Here, it is preferable that the degree of crystallization of the Si framework 21B of the bonding layer 21 is equal to or less than 45%, and it is more preferable that the degree of crystallization of the Si framework 21B is equal to or less than 40%. Accordingly, the Si framework 21B includes a sufficiently random atomic structure, whereby the characteristics of the Si framework 21B are actualized.

Here, "being activated" represents a state in which leaving groups 21C located on the surface and the inside of the bonding layer 21 are detached, and a bond that is not terminated (hereinafter also referred to as a "free bond" or a "dangling bond") is generated in the Si framework 215, a state in which a free bond is terminated by a hydroxyl group (OH group), or a state in which such states are mixed.

Accordingly, the active bond 21D represents a free bond (dangling bond) or a free bond terminated by a hydroxyl group. According to such an active bond 21D, firm joining of the bonding layer 21 can be formed.

As described above, when energy is applied to the plasma polymerized film, an active bond is generated on the surface and the inside thereof, and accordingly, strong adhesiveness is implemented in the plasma polymerized film.

In addition, since an inorganic bonding method not using an adhesive is used, the optical characteristics are not influenced by the degradation of the adhesive.

Furthermore, since the thickness of the adhesive layer 14 is equal to or more than 5 μm and is equal to or less than 10 μm, it is difficult to remove the corners of the light transmitting substrate 11. Accordingly, the bonding layer 21 is formed so as to have no gap by using a plasma polymerization method, whereby the light transmitting substrate 11 and the phase difference plate 20 can be strongly bonded.

In addition, the method of bonding the phase difference plate 20 and the light outgoing face 17 is not limited to the plasma polymerization method, but the phase difference plate 20 and the light outgoing face 17 may be bonded together by using an adhesive that includes modified methacrylate or modified acrylate described above as its main component.

Furthermore, the bonding layer 21 may be formed by using not only the plasma polymerization method but also an atomic diffusion joining method.

In the atomic diffusion joining method, first, microcrystalline continuous thin films are formed as films on a light transmitting substrate 11 and a phase difference plate 20 that configure an element main body 10 through vacuum film formation such as sputtering or ion plating inside a vacuum container. Then, the microcrystalline continuous thin films are superimposed during or after the formation of the films, and atomic diffusion is caused to occur on the joining boundary face and the grain boundary, whereby the light transmitting substrate 11 and the phase difference plate 20 are firmly joined.

Furthermore, not only the microcrystalline continuous thin films are superimposed, but a microcrystalline continuous thin film is formed on one of the light transmitting substrate 11 and the phase difference plate 20, and a microcrystalline structure is formed on the other, and, by superimposing the microcrystalline continuous thin film and the microcrystalline structure, the atomic diffusion joining can be performed.

Also in such a case, since an inorganic bonding method not using any adhesive is used, the optical characteristics are not influenced by the degradation of the adhesive.

Figure 3:
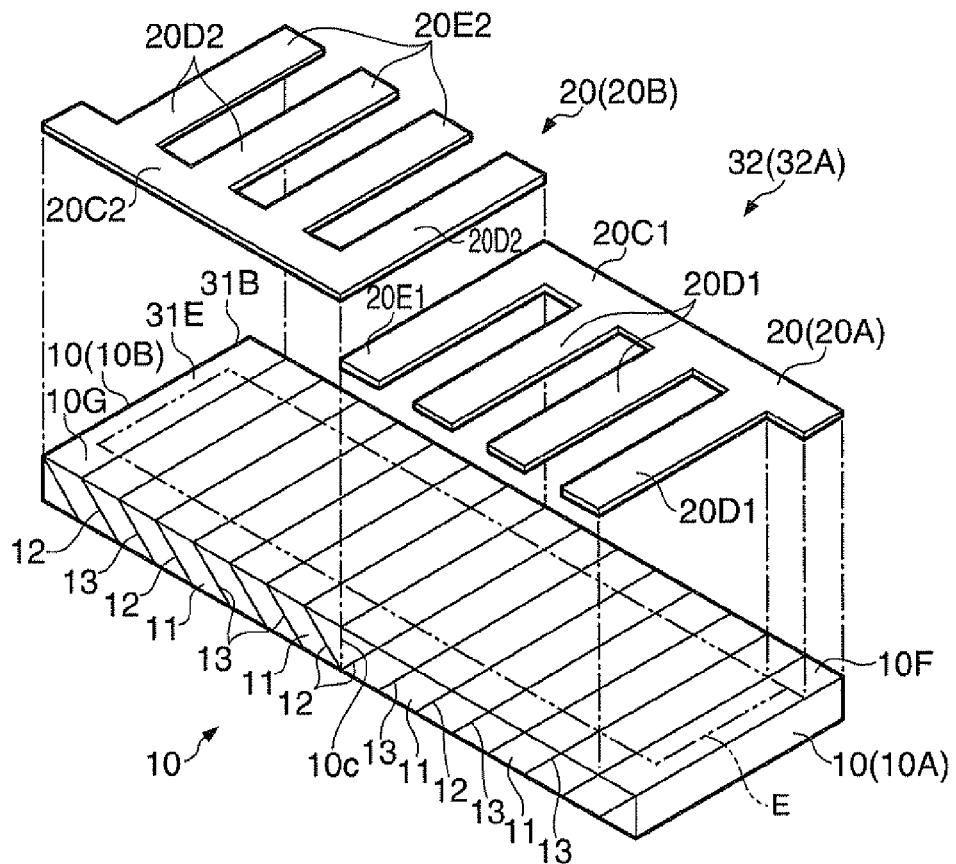
FIG. 3 is an exploded perspective view showing a polarization conversion element according to another embodiment of the invention.

FIG. 3 is an exploded perspective view showing a polarization conversion element according to another embodiment of the invention.

Figure 4:
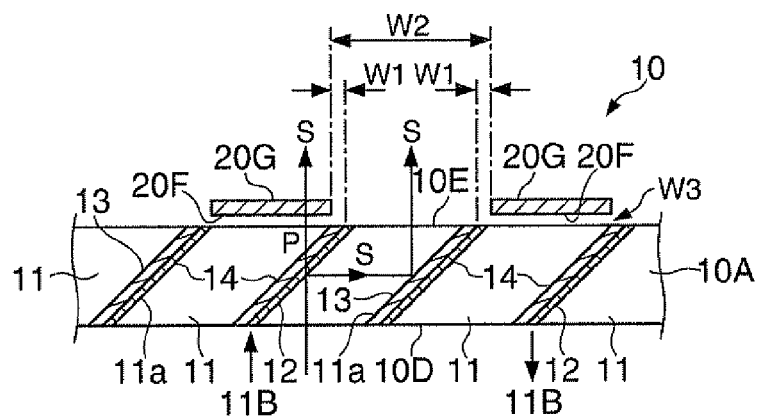
FIG. 4 is a cross-sectional view showing a part of the polarization conversion element shown in FIG. 3 in an enlarged scale.

FIG. 4 is a cross-sectional view showing a part of the polarization conversion element shown in FIG. 3 in an enlarged scale.

The same reference numeral is assigned to the same configuration as that shown in FIG. 1, and detailed description thereof will not be presented.

The polarization conversion element shown in FIGS. 3 and 4 includes an element main body 10 as a PBS array and a phase difference plate 20, which is made of a quartz crystal, that is joined to the element main body 10, serves as a ½ wave plate, rotates the polarizing face of incident linearly-polarized light by 90 degrees, and outputs resultant light.

The element main body 10 has an approximately rectangular parallelepiped shape, and end portions in the longitudinal direction in which two element main bodies 10A and 10B face each other are joined together so as to have symmetry with respect to the joining face 10C.

This element main body 10 includes a light incident face 10D and a light outgoing face 10E that are approximately parallel to each other.

In addition, the element main body 10 includes polarization splitting films 12 and reflective films 13 that are arranged between a plurality of light transmitting substrates 11 so as to be alternately aligned in the longitudinal direction.

Furthermore, each one of the plurality of light transmitting substrates 11 is joined by a joining face 11a that has a predetermined tilt angle with respect to the light incident face 10D or the light outgoing face 10E.

The polarization splitting film 12 and the reflective film 13 are alternately disposed in each boundary portion 11B between the plurality of light transmitting substrates 11.

The polarization splitting film 12 splits light incident to the light incident face 10D into two types of linearly-polarized light beams of which the polarizing directions are perpendicular to each other, transmits one linearly-polarized light beam, and reflects the other linearly-polarized light.

In this embodiment, the polarization splitting film 12 selectively transmits a P-polarized light beam of random polarized light that is incident to the light incident face 10D and reflects S-polarized light.

The reflective film 13 reflects the other linearly-polarized light beam reflected by the polarization splitting film 12 and changes the direction of the optical path thereof. In other words, the reflective film 13 reflects the S-polarized light beam reflected by the polarization splitting film 12 toward the light outgoing face 10E.

The element main body 10, as shown in FIG. 4, includes adhesive layers 14 that join the plurality of light transmitting substrates 11 together.

Here, the adhesive layer 14 may use an optical-based adhesive of an ultraviolet-curing type or the like. In a case where an ultraviolet-curing type adhesive is used, the viscosity is high, and the thickness of the adhesive layer 14 is approximately equal to or more than 10 μm and is equal to or less than 20 μm.

In addition, in a case where an ultraviolet curing-type adhesive that includes modified acrylate or modified methacrylate as its main component is used, the thickness of the adhesive layer 14 can be formed to be as thin as 5 μm or more and 10 μm or less. As examples of ultraviolet-curing adhesive that includes modified acrylate or modified methacrylate as its main component, there are UT20 and HR154 (product name; manufactured by Adell Corp.).

The adhesive layer 14 has a predetermined thickness W1.

The phase difference plates 20 (20A and 20B) are arranged on the light outgoing faces 10E of two element main bodies 10A and 10B.

Since the phase difference plate 20 rotates the polarization plane of the P-polarized light by 90 degrees by causing the P-polarized light beam transmitted through the polarization splitting film 12 to have a phase difference of 180 (degrees), it converts the P-polarized light beam into a linear polarized light beam that is parallel to the polarized plane of the S-polarized light beam that is reflected by the reflective film 13, that is, an S-polarized light beam and outputs the S-polarized light.

In addition, as shown in FIG. 3, the phase difference plate 20 has a comb-like shape (bamboo screen shape).

The phase difference plate 20 (20A and 20B) is joined to the element main body 10 and includes a base portion 20C (20C1 and 20C2) through which light is not transmitted and a phase difference portion 20D (20D1 and 20D2) that extends from the base portion 20C and through which light is transmitted.

In other words, the base portion 20C is arranged outside an effective area (E) that is an optical area of the element main body 10. The base portions 200 are joined in the longitudinal direction of the base portion 200, in other words, in a direction in which the polarization splitting film 12 and the reflective film 13 are alternately aligned.

The base portion 2001 of one phase difference plate 20A is bonded to one end edge portion 10F of end edge portions of the element main body 10 that are parallel to the longitudinal direction, and the base portion 2002 of the other phase difference plate 203 approaches the tip end portion 20E1 of the phase difference portion 20D1 of the one phase difference plate 20A.

In other words, the base portion 2001 of the one phase difference plate 20A approaches the tip end portion 20E2 of the phase difference portion 20D2 of the other phase difference plate 20B, and the base portion 2002 of the other phase difference plate 20B approaches the tip end portion 20E1 of the phase difference portion 20D1 of the one phase difference plate 20A.

In addition, the base portion 20C has a principal plane that is in the shape of a long rectangle, and the width thereof, for example, is in the range of about 3 mm to 4 mm.

The base portion 20C is joined to the element main body 10 through a joining film not illustrated in the figure.

This joining film, similarly to the adhesive layer 14, is disposed by using an optical-based adhesive of an ultraviolet-curing type or the like or a plasma polymerized film. Since the joining film is preferably arranged on the outer side of the effect area E that is an optical area not arranged on the optical path, it is preferable that the joining film is formed only between the base portion 200 and the end edge portions 10F and 10G that are parallel to the longitudinal direction of the element main body 10.

The phase difference plate 20 (phase difference portion 20D) has a strip shape, and the thickness thereof is the same as that of the base portion 200. The phase difference portion 200 extends from the base portion 200 and is arranged on the light outgoing face 10E of the element main body 10 in an area located in an upper portion of the polarization splitting film 12. A plurality of the phase difference portions 200 is arranged with a gap W2 of a predetermined width interposed therebetween, and the S-polarized light beam reflected by the reflective film 13 directly passes through the gap W2.

Each phase difference portion 20D, as shown in FIG. 4, has the light incident face 20F that faces the light outgoing face 10E of the element main body 10.

Between the light incident face 20F of the phase difference portion 200 and the light outgoing face 10E of the element main body 10, a small gap W3 is formed. Accordingly, it is preferable that anti-reflection films, which are not illustrated in the figure, are formed on the light incident face 20F of the phase difference portion 200 and the light outgoing face 10E of the optical element 310.

According to the configuration shown in FIGS. 3 and 4, the phase difference portion 200 of the phase difference plate 20 is not bonded to the element main body 10 by using an adhesive, and accordingly, degradation of the optical characteristics due to the degradation of the adhesive can be avoided.

In addition, since a plurality of phase difference portions 20D is integrated with the base portion 20C, the assembly of the phase difference plate 20 into the element main body 10 can be easily performed.

Figure 5A:
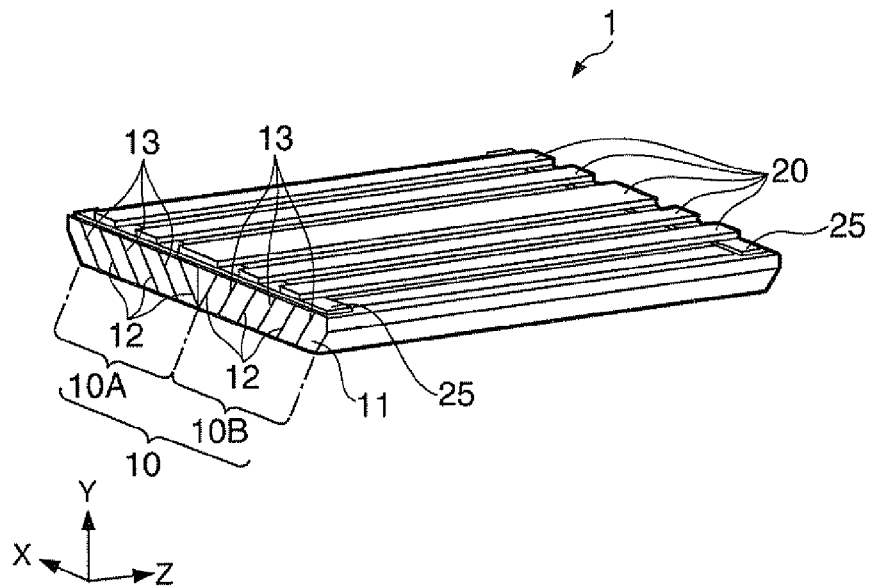
FIGS. 5A and 5B are exploded perspective views showing a polarization conversion element according to a further embodiment of the invention.
Figure 5B:
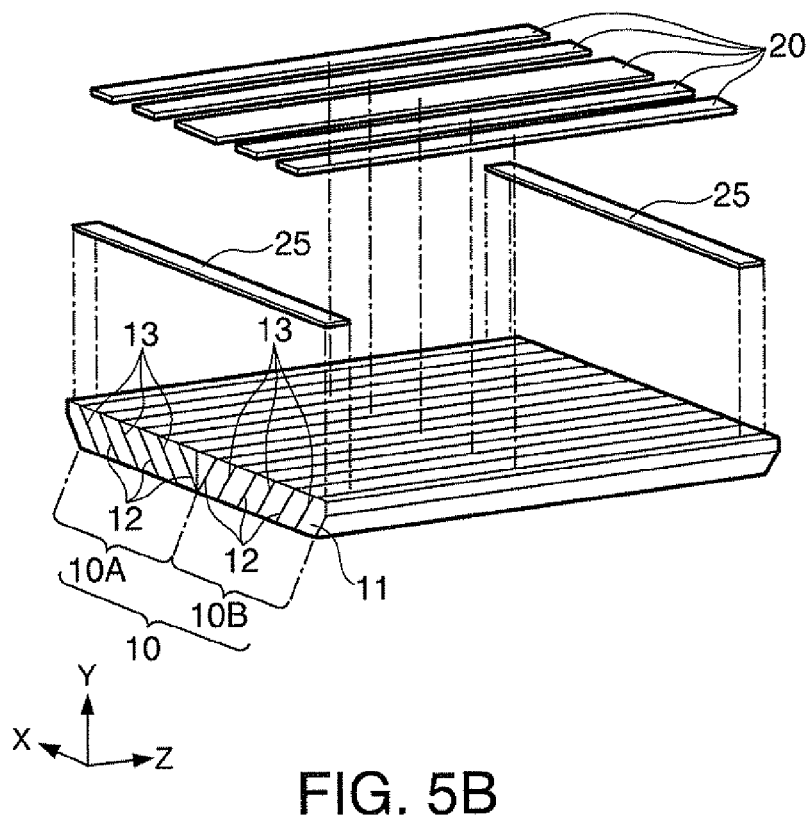

FIGS. 5A and 5B are exploded perspective views showing a polarization conversion element according to a further embodiment of the invention. FIG. 5A is an overall perspective view of the polarization conversion element, and FIG. 5B is an assembly diagram illustrating the assembly of the polarization conversion element.

The configuration and the assembly method of the polarization conversion element 1 according to the another embodiment will be described with reference to FIGS. 5A and 5B.

The polarization conversion element 1 is configured to include a flat plate-shaped element main body 10, a plurality of phase difference plates 20, which are formed from quartz crystal members, having strip shapes, and double-sided tapes 25 as two spacer members.

As shown in FIG. 5B, in the assembly of the polarization conversion element 1, first, the double-sided tapes 25 are attached to both end portions of the element main body 10 in the vertical direction (Z direction) on the light beam emitting side face of the flat plate-shaped element main body 10.

Next, the phase difference plates 20 are placed on the upper faces of the double-sided tapes 25 so as to be coincident with positions corresponding to the polarization splitting films 12 from the upper side (Y direction) of the attached doubled-sided tapes 25, and the phase difference plates 20 are pressed. Through such a series of the assembly processes, the polarization conversion element 1 is completed. This assembly process is performed by using an assembly jig.

An attachment object can be peeled from and re-attached to the double-sided tapes 25. The tape thickness of the double-sided tapes 25 is 0.15 mm. By using such double-sided tapes 25, in a case where a placed position is not appropriate for any reason when the phase difference plate 20 is placed on the upper faces of the double-sided tapes 25, the phase difference plate 20 that is not placed at an appropriate position is detached from the double-sided tapes 25 and is bonded thereto again.

The polarization conversion element 1 assembled as above is in the form of being interposed between both end portions of element main body 10 that are located on the light beam outgoing side and both end portions of the phase difference plate 20 that are located on the light beam incident side with the double-sided tape 25 interposed therebetween. In addition, the double-sided tapes 25 are located at positions outside the effective range of light beams emitted from the light source in the polarization conversion element 1.

Next, the manufacturing process of the element main body 10 will be described in more detail.

The manufacturing process is largely configured by a film forming process, a bonding process, a cutting process, and a grinding process.

FIGS. 6 to 12 are diagrams illustrating the manufacturing process of a polarization conversion element according to this embodiment, particularly, an element main body thereof.

Film Forming Process

Figure 6:
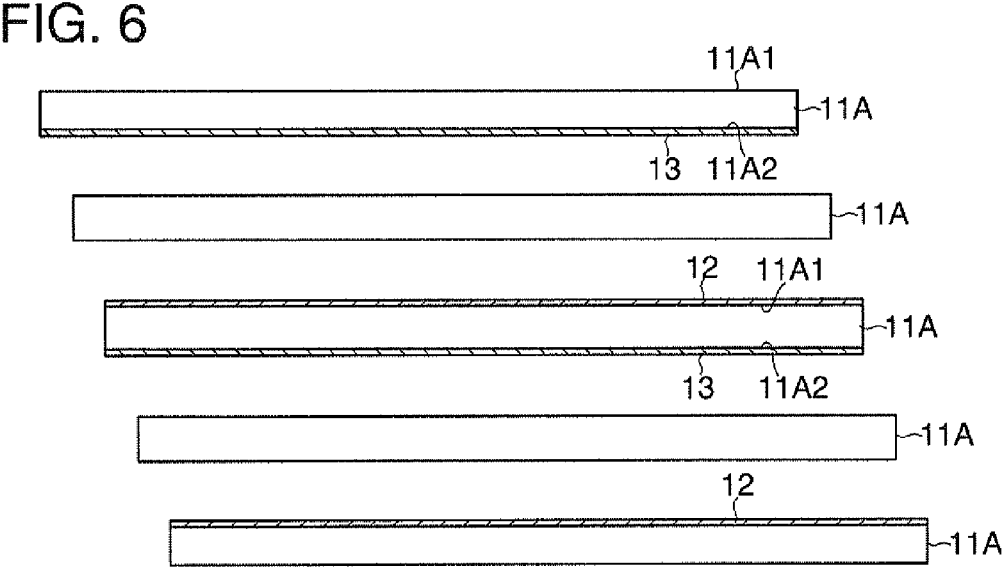
FIG. 6 is a diagram illustrating a manufacturing process of the polarization conversion element according to the embodiment.

In the film forming process as the first process, as shown in FIG. 6, first, a plurality of light transmitting substrates (colorless light transmitting substrates formed from glass or the like) 11A is prepared. Such a light transmitting substrate 11A includes a first face 11A1 and a second face 11A2 that are approximately parallel to each other.

In some light transmitting substrates 11A out of the plurality of light transmitting substrates 11A, a polarization splitting film 12 is formed on the first face 11A1, and a reflective film 13 is formed on the second face 11A2.

In the other light transmitting substrates 11A, on the first face 11A1 and the second face 11A2, one of such films or no film is formed.

Bonding Process

Figure 7:
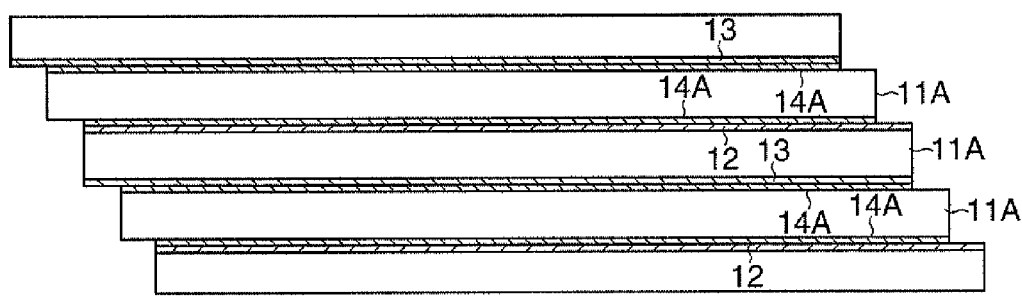
FIG. 7 is a diagram illustrating a manufacturing process of the polarization conversion element according to the embodiment.

In the bonding process shown in FIG. 7, the light transmitting substrate 11A on which the polarization splitting film 12 and the reflective film 13 are formed and the light transmitting substrate 11A on which such films are not formed are alternately bonded together by the adhesives 14A. At this time, the polarization splitting film 12 and the reflective film 13 are alternately stacked with the light transmitting substrate 11A interposed therebetween.

Here, an adhesive that includes modified acrylate or modified methacrylate as its main component is used as the adhesive 14A, and the coating amount thereof is adjusted such that the thickness after curing is in the range of 5 to 10 μm.

Figure 8:
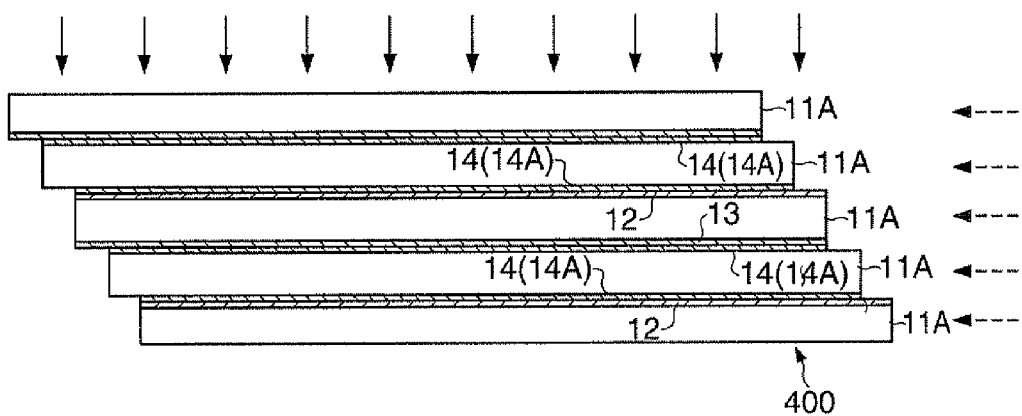
FIG. 8 is a diagram showing a measurement result of tensile strength in a curing test.

Next, as shown in FIG. 8, ultraviolet light is emitted to the first face 11A1 of the light transmitting substrate 11A in a direction that is approximately perpendicular to the first face 11A1 of the light transmitting substrate 11A. Here, since the ultraviolet light passes through the polarization splitting film 12 and the reflective film 13, all the adhesives 14A shown in FIG. 8 are simultaneously cured.

Accordingly, the adhesive layers 14 are formed between the polarization splitting film 12 and the light transmitting substrate 11A and between the reflective film 13 and the second light transmitting substrate. Thus, a laminated body 400 is formed which is acquired by bonding the plurality of the light transmitting substrates 11A.

In addition, the ultraviolet light may be emitted from a direction that is approximately parallel to the first face 11A1 of the light transmitting substrate 11A.

Here, the relationship between a curing condition of the adhesive 14A and the bonding strength of the adhesive layer 14 that is acquired under each curing condition will be described.

As shown in Table 1 below, Curing Tests 1 to 7 were performed by changing the emission amount of the ultraviolet light (UV). As a result, the tensile strength is represented in Table 1 and FIGS. 9A and 9B, and the shearing strength is represented in Table 1 and FIGS. 10A and 10B.

Figure 9A:
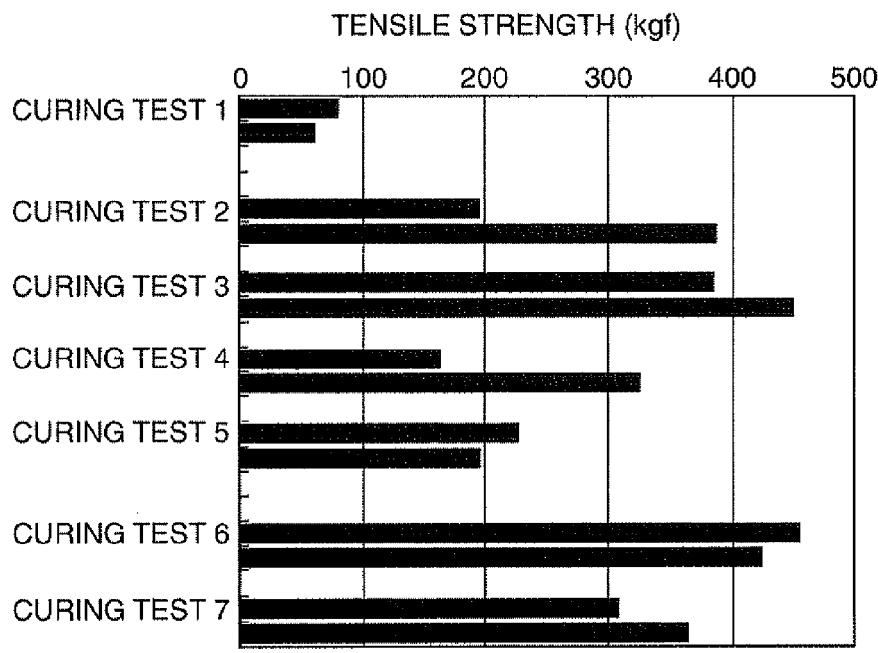
FIGS. 9A and 9B are diagrams showing measurement results of shearing strength in a curing test.
Figure 9B:
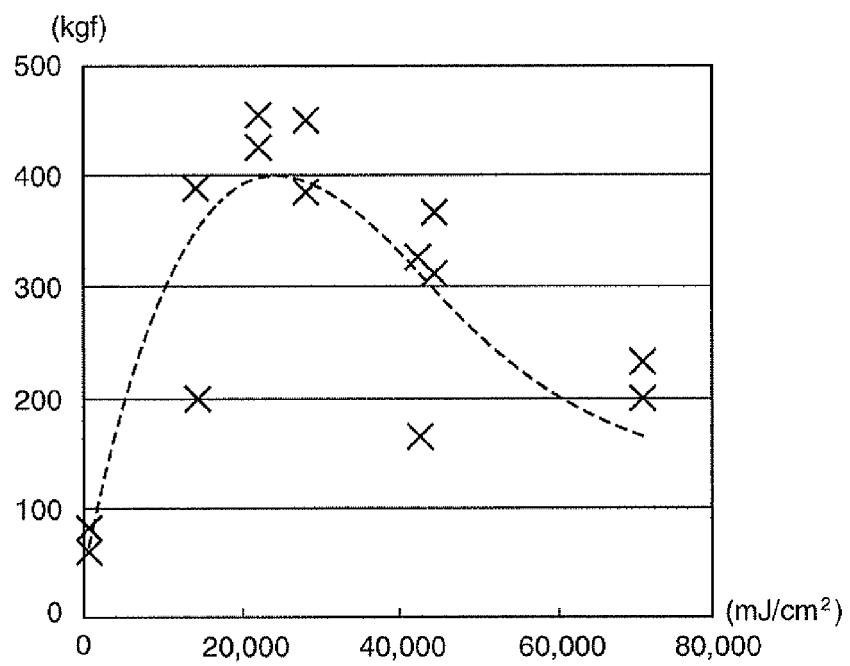
Figure 10A:
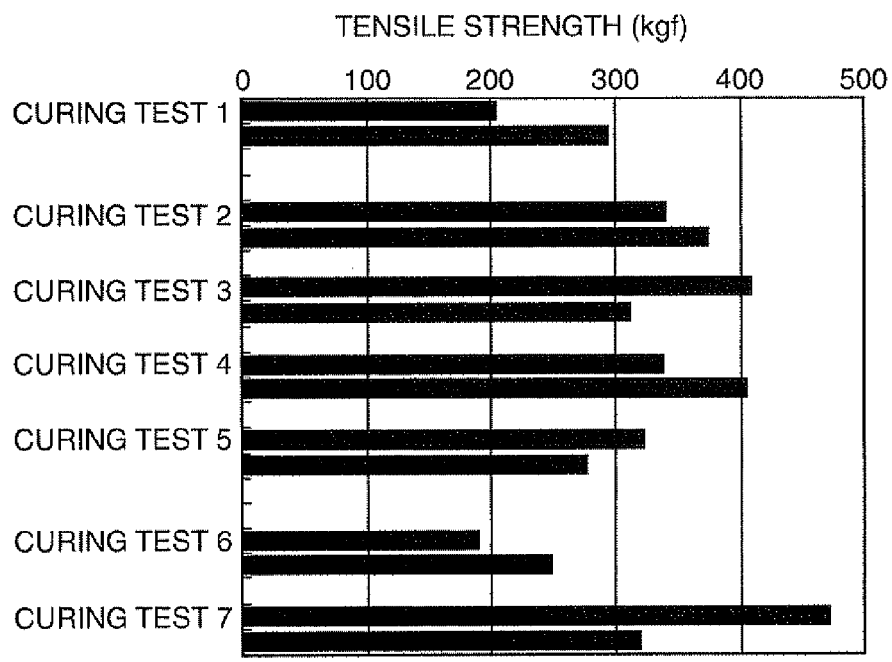
FIGS. 10A and 10B are diagrams illustrating a manufacturing process of the polarization conversion element according to the embodiment.
Figure 10B:
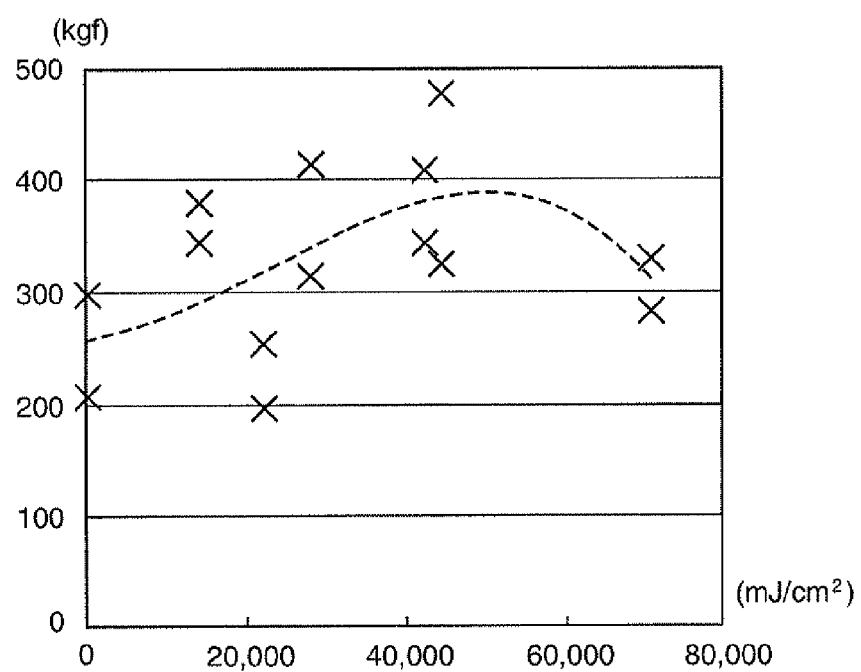

In other words, as shown in FIGS. 9A and 9B, in a case where the emission amount of the ultraviolet light is equal to or more than 15,000 mJ/cm$^2$ and is equal to or less than 45,000 mJ/cm$^2$, and more particularly, in a case where the emission amount is equal to or larger than 20,000 mJ/cm$^2$ and is equal to or smaller than 35,000 mJ/cm$^2$, the tensile strength of the adhesive layer 14 is high, which is preferable. On the other hand, as shown in FIGS. 10A and 10E, in a case where the emission amount of the ultraviolet light is equal to or larger than 15,000 mJ/cm$^2$ and is equal to or less than 60,000 mJ/cm$^2$, particularly, in a case where the emission amount is equal to or larger than 25,000 mJ/cm$^2$ and is equal to or less than 50,000 mJ/cm$^2$, the shearing strength of the adhesive layer 14 is high, which is preferable. Each curing test was performed twice, which is illustrated in Table 1.

The tests of the tensile strength and the shearing strength were performed by using the following test method. By using a tension tester, a tensile weight was applied to a test sample, which was acquired by bonding two white glass plates having a size of 10 mm×10 mm together by using an adhesive 14A, in the vertical direction or in the parallel direction with respect to the bonding face, and the weight at a time when the two white glass plates were separated from each other was measured.

TABLE 1

| | CURING CONDITION | STRENGTH TEST | |
|---|---|---|---|
| CURING TEST | AMOUNT OF UV RADIATION (mJ/cm$^2$) | TENSILE STRENGTH | SHEARING STRENGTH |
| 1 | 319 | 80.9910 | 205.4220 |
| | | 60.8006 | 297.7320 |
| 2 | 14,419 | 198.2330 | 343.6190 |
| | | 389.2000 | 378.9010 |
| 3 | 28,519 | 385.3000 | 413.4440 |
| | | 450.9440 | 313.5120 |
| 4 | 42,619 | 164.2760 | 343.5930 |
| | | 325.8500 | 407.4280 |
| 5 | 70,819 | 229.9720 | 328.8330 |
| | | 198.2580 | 282.4610 |
| 6 | 22,504 | 455.7880 | 194.4600 |
| | | 425.1200 | 252.9660 |
| 7 | 44,689 | 310.5040 | 476.2840 |
| | | 365.3900 | 324.6270 |

Figure 11:
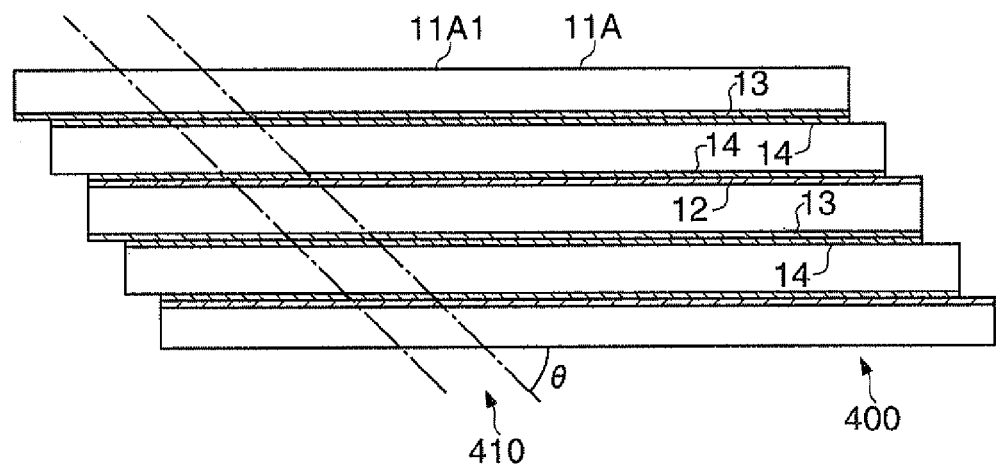
FIG. 11 is a diagram illustrating a manufacturing process of the polarization conversion element according to the embodiment.

Next, as shown in FIG. 11, as a cutting process, the laminated body 400 is cut off approximately parallel with the cut face that forms a predetermined angle θ (about 45 degrees) with the first face 11A1, whereby a laminated block 410 is cut out.

Figure 12:
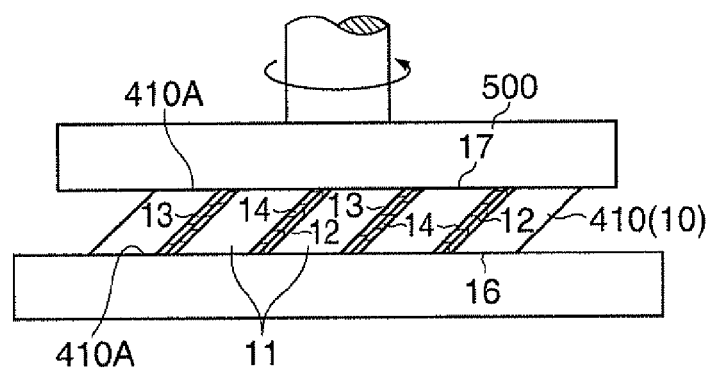
FIG. 12 is a diagram illustrating a manufacturing process of the polarization conversion element according to the embodiment.

In a subsequent grinding process shown in FIG. 12, the cut face 410A of the cut laminated block 410 is ground by a grinding device 500, whereby the element main body 10 of the polarization conversion element 1 can be acquired.

Heat Resistance Test

The heat resistance of the adhesive (adhesive layer) was evaluated in Example 1 and Comparative Example 1.

Figure 13:
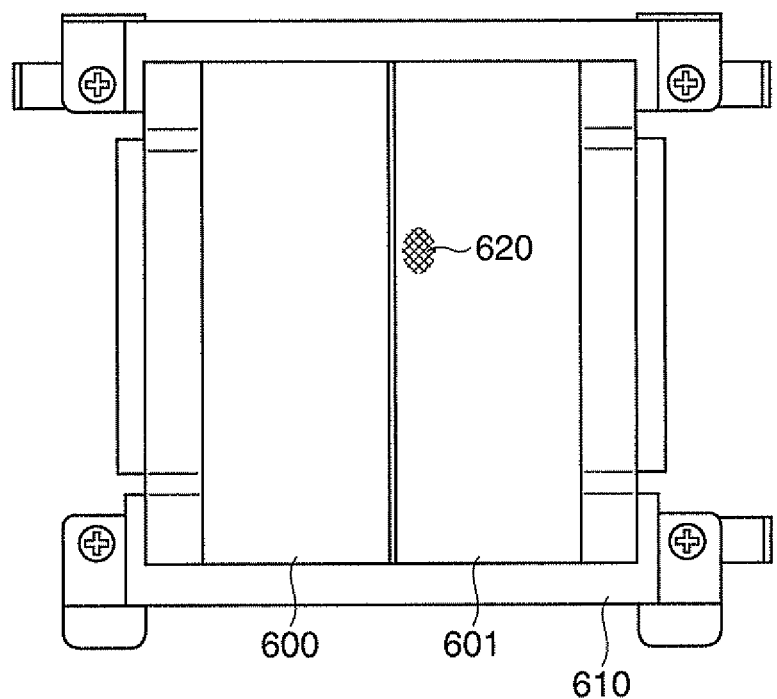
FIG. 13 is a diagram showing a heat-resistance test for an example of the embodiment and a general example.
Figure 14A:
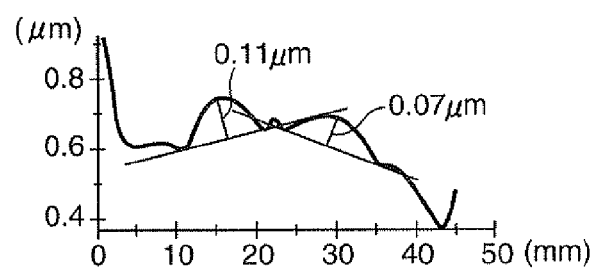
FIGS. 14A to 14E are diagrams showing results of flatness tests for examples of the embodiment.
Figure 14B:
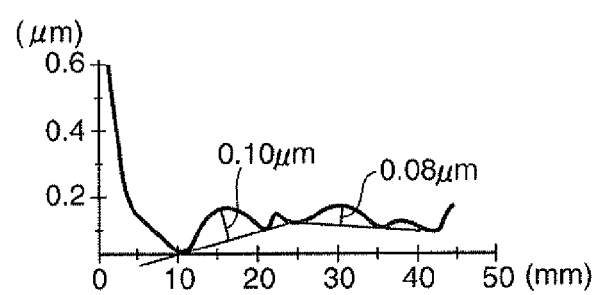
Figure 14C:
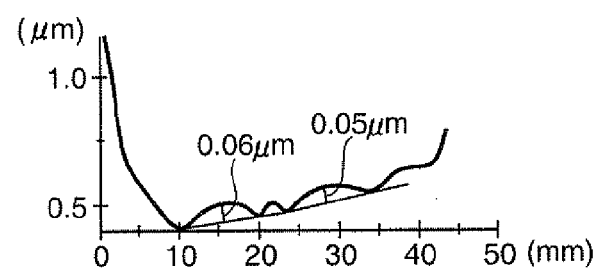
Figure 14D:
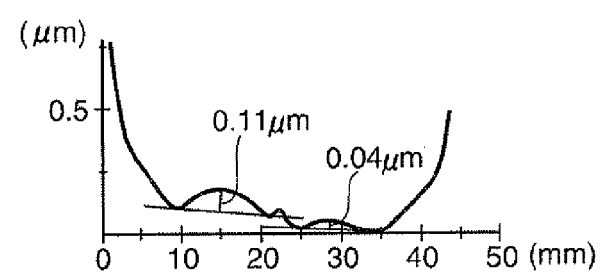
Figure 14E:
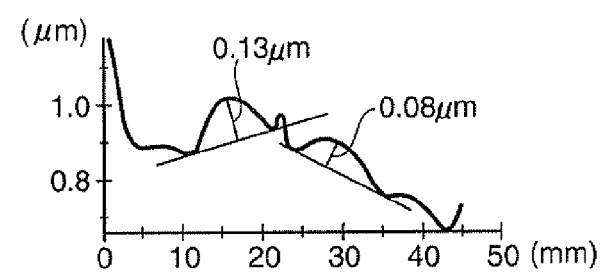
Figure 15A:
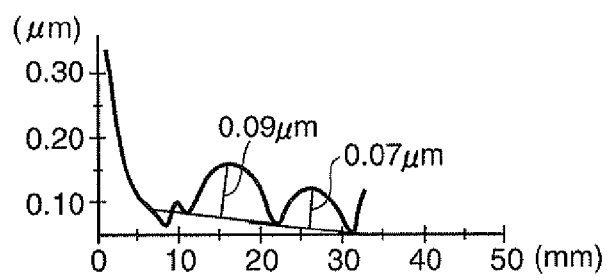
FIGS. 15A to 15E are diagrams showing results of flatness tests for examples of the embodiment.
Figure 15B:
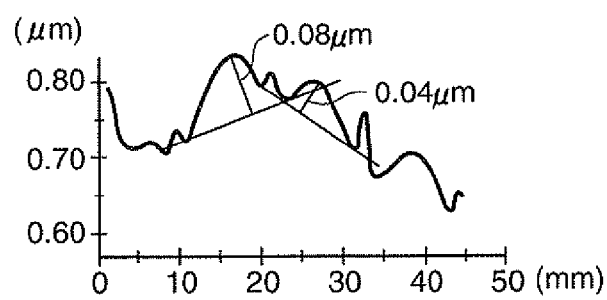
Figure 15C:
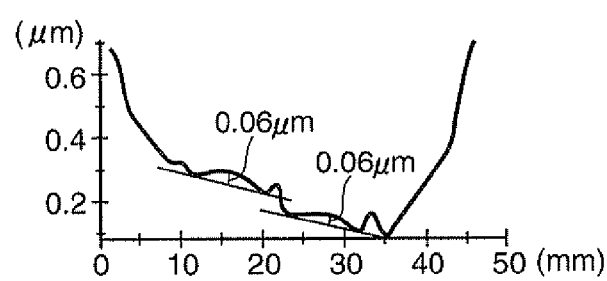
Figure 15D:
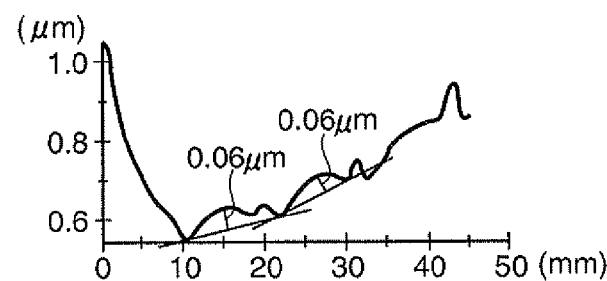
Figure 15E:
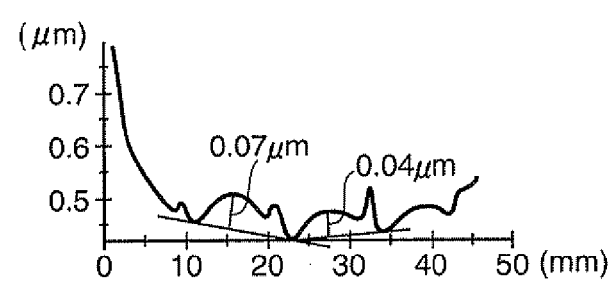

FIG. 13 is a diagram showing a heat resistance test of Example 1 and Comparative Example 1.

In Example 1, two glass plates were bonded by using an adhesive (UT20; made by Adell Corp.), and a predetermined amount of ultraviolet light was emitted thereto. Accordingly, a test piece 600 of Example 1 was produced.

On the other hand, in Comparative Example 1, two glass plates were bonded together by using a general adhesive (PhotoBond 300; manufactured by Sunrise MSI Corp.), and a predetermined amount of ultraviolet light was emitted thereto. Accordingly, a test piece 601 of Comparative Example 1 was produced.

These test pieces 600 and 601 were fixed within a fixing frame 610, and the test pieces 600 and 601 were built in a place at which the polarization conversion element of the projector was to be disposed, and the cooling mechanism of the projector was adjusted such that the temperature of the test pieces was 120° C. when light of a light source lamp was emitted to the test pieces 600 and 601. FIG. 13 shows a test result in a case where the test pieces were left under such an environment for 3800 hours.

As shown in FIG. 13, while yellow discoloration 620 partially appeared in the adhesive layer of the test piece 601, no yellow discoloration appeared in the adhesive layer of the test piece 600.

In addition, as results of continuously leaving the test pieces 600 and 601 in such an environment, after 4800 hours, marked yellow discoloration appeared in the adhesive layer of the test piece 601. On the other hand, in the adhesive layer of the test piece 600, only slight yellow discoloration of a degree not affecting the optical characteristics appeared.

Accordingly, it can be understood that the adhesive layer formed by using the adhesive according to the embodiment of the invention has superior heat resistance.

Flatness Test

Examples 2 to 11 and Comparative Example 2

The degrees of flatness of the light incident face and the light outgoing face of the polarization conversion element according to the embodiment of the invention were evaluated for Examples 2 to 11 and Comparative Example 2.

FIGS. 14A to 14E are diagrams showing results of flatness tests for Examples 2 to 6 of the invention. FIGS. 15A to 15E are diagrams showing results of flatness tests for Examples 7 to 11 of the invention. FIG. 16 is a diagram showing a result of a flatness test for Comparative Example 2.

Examples 2 to 6

In Example 2, an element main body 10 as shown in FIG. 25 to be described later was produced by using the same adhesive as that of Example 1. In addition, a left element main body 10 out of two element main bodies 10 shown on the left and right sides in FIG. 25 was used. Then, by using the following measurement method, a cross-sectional view at the approximate center of the light incident face 16 of the element main body 10 was acquired. Here, the cross-sectional view is a cross-sectional view taken along the horizontal direction in FIG. 25.

In the acquired cross-sectional view, a convex portion that is relatively largely expanded to the upper side is selected, and vertexes of concave portions near the left and right sides of the convex portion are joined with a line. A distance from this line to each vertex of the convex portion was converted into the scale of the vertical axis, and a "height difference" was calculated.

Also in Examples 3 to 6, an element main body 10 was produced similarly to Example 2, and the light incident face 16 was measured so as to acquire a cross-sectional view. Then, based on the cross-sectional view, similarly to Example 2, the "height differences" were calculated for two points. FIGS. 14A to 14E show such results.

Examples 7 to 11 and Comparative Example 2

In Examples 7 to 11, for the light outgoing face 17 of the element main body 10 manufactured in Examples 2 to 6, a cross-sectional view was acquired similarly to Example 2. Based on the acquired cross-sectional view, similarly to Example 2, the "height differences" were calculated for two points.

In Comparative Example 2, except for using the same adhesive as that of Comparative Example 1 as an adhesive, the element main body was produced similarly to Example 2, and a cross-sectional view in which the light outgoing face was measured was acquired. Based on the acquired cross-sectional view, similarly to Example 2, the "height differences" were calculated for two points.

The results of Examples 7 to 11 and Comparative Example 2 are shown in FIGS. 15A to 15E and 16.

As a method of measuring the cross-sectional view, by using a laser interferometer G102S (manufactured by Fujinon Corp. (currently, Fuji Film Corp.)), light was emitted onto the light incident face or the light outgoing face of the element main body, and interference fringes were acquired by allowing reflective light reflected from the element main body and original parallel light to interfere with each other. Here, the wavelength of light that is set in the laser interferometer is 685 nm.

By analyzing the acquired interference fringes by using interference fringe analyzing software (produced by Fujinon Corp. (currently, Fuji Film Corp.)), the cross-sectional view of the light incident face or the light outgoing face is acquired.

As shown in FIGS. 14A to 14E and 15A to 15E, in Examples 2 to 11 in which the adhesive according to the embodiment of the invention was used, the height differences on the light incident face and the light outgoing face were small, and it is understood that the flatness is superior.

On the other hand, as shown in FIG. 16, in the comparative example in which a general adhesive was used, the height difference is large, and it is disclosed that the flatness is not good.

Structure of Wave Plate

Hereinafter, the configuration of a phase difference plate according to an embodiment of the invention will be described.

FIGS. 17A and 17B are diagrams showing the configuration of a high-order mode laminated ½ wave plate (hereinafter, referred to as a laminated ½ wave plate) as an example of a phase difference plate according to an embodiment of the invention. FIG. 17A is a perspective view, and FIG. 17B is an exploded perspective view.

As shown in FIG. 17A, the laminated ½ wave plate 20 according to the embodiment of the invention has a configuration in which a first wave plate 30 and a second wave plate 40 of a high-order mode which use inorganic optical crystals such as quartz crystals are bonded such that optical axes 31 and 41 thereof intersect each other and is configured to shift the phase of a linearly polarized light beam A incident from a light source side by 180 (degrees) as a whole and serve as a ½ wave plate that converts the incident light into a linearly-polarized light beam B acquired by rotating the polarization plane by θ=90 (degrees) and outputs the converted linearly-polarized light.

In addition, as shown in FIG. 178, the azimuth of the optical axis of the first wave plate 30 is assumed to be θ1, and the azimuth of the optical axis of the second wave plate 40 is assumed to be θ2.

Here, the azimuth of the optical axis is an angle that is formed by the crystalline optical axis and the polarization plane of linearly-polarized light beam incident to the laminated wave plate.

In addition, the cut angles of the first wave plate 30 and the second wave plate 40 are 90 (degrees) Z (an intersection angle between the normal line direction of the principal face of the quartz crystal plate and the optical axis (Z axis) is 90 degrees).

According to the embodiment of the invention, in a case where the laminated ½ wave plate 20 is used in the polarization conversion element that is built in a liquid crystal projector, when a phase difference of the first wave plate 30 for a predetermined designed wavelength λ, for example, light (green light) of 520 nm is Γ1, and the phase difference of the second wave plate 40 is Γ2, the following Equation is satisfied.

$$|\Gamma1-\Gamma2|=180\text{(degrees)} \quad (1)$$

For example, the thickness of the first and second wave plates 30 and 40 are set such that Γ1=2110 (degrees) and Γ2=1930 (degrees) are satisfied.

The relationship between the phase difference Γ with respect to light of a wavelength λ and the plate thickness t of the wave plate is Γ=2π/λ×(ne−no)×t (here, ne is the refractive index of ideal light, and ne is a refractive index of normal light). Thus, in a case where Γ1=2110 (degrees) and Γ2=1930 (degrees), the plate thickness t1 of the first wave plate 30 and the plate thickness t2 of the second wave plate 40 are respectively t1=0.3305 (mm) and t2=0.3023 (mm).

In addition, the laminated ½ wave plate 20, for a broad band including the wavelength bands (R (red: 400 nm band), G (green: 500 nm band), and B (blue: 675 nm)) that are necessary for a liquid crystal projector, has a polarization conversion efficiency of approximately 0.8 or more and, particularly for the G band, a polarization conversion efficiency of approximately 1.0, and accordingly, a phase difference of 180 (degrees) is required.

In a case where a ½ wave plate 20 is configured by using the first and second wave plates 30 and 40 as a whole, in order to configure a phase difference of 180 (degrees) with respect to the incidence light, a technique is used in which a phase difference, a conversion efficiency, and the like are acquired by variously changing the phase differences Γ1 and Γ2 of the first and second wave plates 30 and 40 for a predetermined wavelength and the azimuths θ1 and θ2 thereof as configuration parameters of the laminated ½ wave plate 1.

As a result, it has been found that the phase difference for incidence light of a broad band including the above-described three wavelength bands RGB is 180 (degrees), so that the polarization conversion efficiency is approximately 1 by satisfying the following relationship between the azimuth θ1 of the optical axis of the first wave plate 30 and the azimuth θ2 of the optical axis of the second wave plate 40.

$$\theta1=45\text{(degrees)} \quad (2)$$

$$\theta2=135\text{(degrees)} \quad (3)$$

$$\theta2-\theta1=90\text{(degrees)(the azimuths of the optical axes are perpendicular to each other)} \quad (4)$$

Here, the range of values that can be taken by the design wavelength λ, is 490≤λ≤550 (nm).

Figure 18:
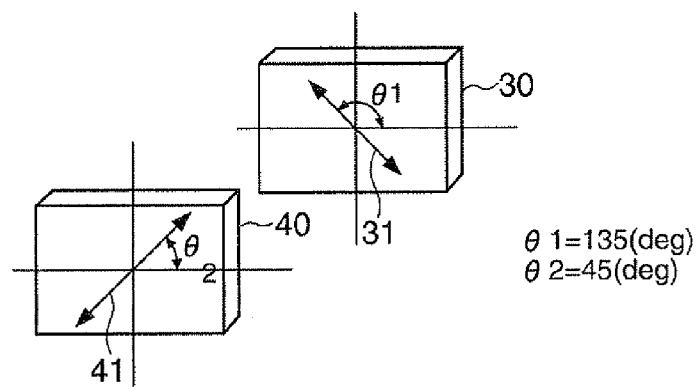
FIG. 18 is an exploded perspective view showing the configuration of a high-order mode laminated ½ wave plate as an example of a phase difference plate according to another embodiment of the invention.

FIG. 18 is an exploded perspective view showing the configuration of a high-order mode laminated ½ wave plate as an example of a phase difference plate (hereinafter, referred to as a laminated ½ wave plate) according to another embodiment of the invention.

In the case shown FIG. 18, the azimuth θ1 of the optical axis of the first wave plate 30 and the azimuth θ2 of the optical axis of the second wave plate 40 are reversed from those of the case shown in FIGS. 17A and 17B.

In other words, by satisfying Γ1=1930 (degrees), Γ2=2110 (degrees), θ1=135 (degrees), θ2=45 (degrees), and θ1−θ2=90 (degrees), the phase difference for light of a broad wavelength band including the above-described three wavelength bands is 180 (degrees), and the polarization conversion efficiency is approximately "1".

Also in such a case, the range of values that can be taken by the design wavelength λ is 490≤λ≤550 (nm).

Next, how the above-described azimuths θ1 and θ2 of the optical axes have been found will be described as below.

First, a calculation technique for finding the laminated ½ wave plates according to examples of the invention will be briefly described. The polarization state of the linearly-polarized beam after being transmitted through two wave plates can be represented by using a Mueller matrix or a Jones matrix.

$$E = R2 \cdot R1 \cdot I \quad (5)$$

Here, I is the polarization state of incidence light, and E is a vector that represents the polarization state of emission light. In addition, R1 is a Mueller matrix of the first wave plate 30 of the laminated ½ wave plate 20, and R2 is a Mueller matrix of the second wave plate 40, which are represented by the following Equations.

$$R_1 = \begin{bmatrix} 1 & 0 & 0 & 0 \\ 0 & \dfrac{1-(1-\cos\Gamma_1)}{\sin^2 2\theta_1} & \dfrac{1-(1-\cos\Gamma_1)}{\sin 2\theta_1 \cos 2\theta_1} & -\sin\Gamma_1 \sin 2\theta_1 \\ 0 & \dfrac{(1-\cos\Gamma_1)}{\sin 2\theta_1 \cos 2\theta_1} & \dfrac{1-(1-\cos\Gamma_1)}{\sin^2 2\theta_1} & \sin\Gamma_1 \cos 2\theta_1 \\ 0 & \sin\Gamma_1 \sin 2\theta_1 & \sin\Gamma_1 \cos 2\theta_1 & \cos\Gamma_1 \end{bmatrix} \quad (6)$$

$$R_2 = \begin{bmatrix} 1 & 0 & 0 & 0 \\ 0 & \dfrac{1-(1-\cos\Gamma_2)}{\sin^2 2\theta_2} & \dfrac{1-(1-\cos\Gamma_2)}{\sin 2\theta_2 \cos 2\theta_2} & -\sin\Gamma_2 \sin 2\theta_2 \\ 0 & \dfrac{(1-\cos\Gamma_2)}{\sin 2\theta_2 \cos 2\theta_2} & \dfrac{1-(1-\cos\Gamma_2)}{\sin^2 2\theta_2} & \sin\Gamma_2 \cos 2\theta_2 \\ 0 & \sin\Gamma_2 \sin 2\theta_2 & \sin\Gamma_2 \cos 2\theta_2 & \cos\Gamma_2 \end{bmatrix} \quad (7)$$

The phase differences $\Gamma_1$ and $\Gamma_2$ of the first and second wave plates 30 and 40 and the azimuths $\theta_1$ and $\theta_2$ of the optical axes are set, and the Mueller matrixes R1 and R2 are acquired by using Equations (6) and (7).

Then, by setting the polarization state T of the incident light, the polarization state E of emission light can be calculated by using Equation (4).

When a case is described in which the Mueller matrix is used as the matrix, the polarization state E of emission light is represented by the following Equation.

$$E = \begin{bmatrix} S_{01} \\ S_{11} \\ S_{21} \\ S_{31} \end{bmatrix} \quad (8)$$

The elements S01, S11, S21, and S31 of matrix E are called Stokes parameters and represent a polarization state. By using these Stokes parameters, the phase difference F of the wave plate can be represented by the following Equation.

$$\Gamma = \tan^{-1} \dfrac{S_{31}}{\sqrt{S_{11}^2 + S_{21}^2}} \quad (9)$$

$$\Gamma = (2m-1) \times \pi$$

Here, m is a positive integer.

As above, the phase difference can be calculated by using Equation (9).

In addition, as described above, the laminated ½ wave plate 20 shown in FIGS. 17A, 17B, and 18 has a function of rotating the polarization plane of linearly-polarized light by a predetermined rotation angle θ, and, for example, rotates the polarization plane of a linearly-polarized light beam A having an oscillation plane in the horizontal direction as input light by θ=90 (degrees) (phase modulation) and outputs as a linearly-polarized light beam B having an oscillation plane in the horizontal direction.

Figure 19:
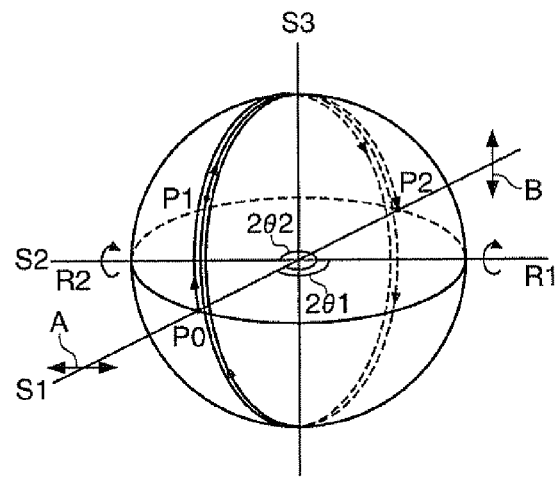
FIG. 19 is a diagram showing a Poincare sphere that illustrates the locus of a polarized state in the laminated ½ wave plate shown in FIGS. 17A and 17B.

FIG. 19 is a diagram showing a Poincare sphere that illustrates the locus of a polarized state in the laminated ½ wave plate 20 shown in FIGS. 17A and 17B.

When being considered as the Poincare sphere shown in FIG. 19, this phase modulation (rotation by 90 (degrees)) modulates light from an incidence polarization state P0 to P2, and a phase difference that is necessary at this time is 180 (degrees).

In a case where the laminated ½ wave plate 20 serves as a complete ½ wave plate, when a light beam is incident as the linearly-polarized light beam A having a polarization direction that is parallel to the equator from a predetermined position P0 located on the equator, the light beam is rotated by 50 (degrees) (50+360×6=2110) around the optical axis R1 (2·θ1) as its center so as to be moved to P1 by the first wave plate 30 and is further rotated by 130 (degrees) (130+360× 5=1930) around the optical axis R2 (2·θ2) as its center so as to arrive at P2 (on the equator) by the second wave plate 40. Accordingly, the incident light beam becomes a linearly-polarized light beam B that is rotated by θ=90 (degrees) with respect to the linearly-polarized light beam A and is output from the ½ wave plate 20.

Here, P2 is a point located on the equator that is acquired by rotating P0 by 180 (degrees).

In addition, the product of the matrix E that represents the polarization state of outgoing light and the matrix P of a polarizer is calculated, and the polarization state is precisely determined by using the acquired amount of light as an evaluation value. This is defined as a conversion efficiency.

In particular, the transmission axis of the matrix P of the polarizer is set to 90 (degrees), and the amount of light of the polarization plane component in the direction of 90 (degrees) can be calculated by using the Stokes parameters of matrix T that are acquired through the product of the matrix P and the matrix E representing the polarization state of outgoing light. The product of the matrix E representing the polarization state of outgoing light and the matrix P of the polarizer is as the following equation.

In other words, when the transmission axis of the matrix P of the polarizer is set to a predetermined angle, and the product of the matrix E representing the polarization state E of the outgoing light and the matrix P of the polarizer is denoted by T, T is represented by the following equation.

$$T = P \cdot E \quad (10)$$

Here, the matrix T represents the conversion efficiency. When the matrix T is represented by the Stokes parameters of the elements, it can be represented by the following equation.

$$T = \begin{bmatrix} S_{02} \\ S_{12} \\ S_{22} \\ S_{32} \end{bmatrix} \quad (11)$$

Here, S02 of the Stokes parameters of the vector T represents the amount of light. When the amount of incidence light is set to "1", S02 represents the conversion efficiency.

Accordingly, the conversion efficiency T of the laminated ½ wave plate 1 can be simulated by variously changing the order number n of the high-order mode of the first, second, and third wave plates 2, 3, and 4, phase differences $\Gamma_1$, $\Gamma_2$, and $\Gamma_3$ at a predetermined wavelength (for example, when the wavelength is the designed wavelength λ=520 nm), and the azimuths θ1, θ2, and θ3 of the optical axes.

The phase difference and the conversion efficiency can be acquired based on the matrix E that represents the polarization state after transmission through the laminated ½ wave plate.

The above-described conversion efficiency was used as an evaluation criterion, and, simulation was performed by using a computer by variously changing the phase differences Γ1 and Γ2 of the first and second wave plates 30 and 40 for a predetermined wavelength (for example, a wavelength of 520 nm) and the azimuths θ1 and θ2 of optical axes thereof as various parameters of the laminated ½ wave plate.

The simulation was repeatedly performed, and the parameters in a case where the conversion efficiency is high for the desired broad wavelength band were selected.

The results will be described as below.

When the cut angles of the first and second wave plates 30 and 40 of the laminated ½ wave plate 20 shown in FIGS. 17A and 17B are 90 (degrees) Z (the intersection angle between the normal line direction of the principal face of the quartz crystal plate and the optical axis (Z axis) is 90 (degrees)), and the wavelength 2 is 520 nm, in a case where the phase difference Γ1 and the azimuth θ1 of the optical axis of the first wave plate 30 are set to 2110 (=130+360×6) (degrees) and 45 (degrees), and the phase difference Γ2 and the azimuth θ2 of the optical axis of the second wave plate are set to 1930 (=130+360×5) (degrees) and 135 (degrees), as a result of acquiring the conversion efficiency of the laminated ½ wave plate 20 through the simulation, a high wavelength-conversion efficiency (polarization conversion efficiency) was acquired (to be described later).

In addition, the ranges of the azimuths θ1 and θ2 of optical axes are effective in the range of ±5 (degrees) from the set angle in accordance with the required specifications or as an allowable error.

Figure 20:
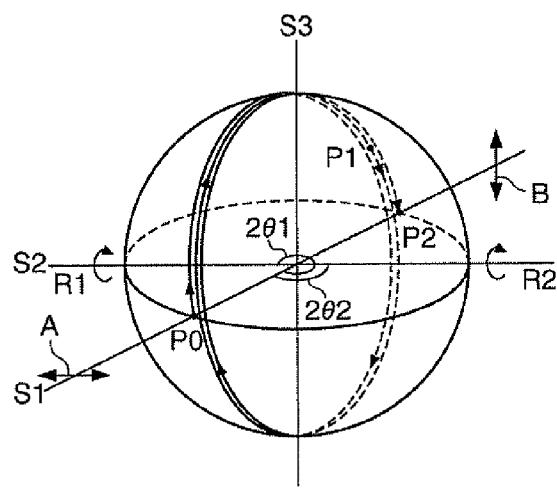
FIG. 20 is a diagram illustrating a transition in the orbit of a linearly-polarized light beam in a Poincare sphere in the laminated ½ wave plate having the configuration shown in FIG. 18.

FIG. 20 is a diagram illustrating a Poincare sphere that represents the orbit in the polarized state of the laminated ½ wave plate 20 shown in FIG. 18.

When a light beam is incident as the linearly-polarized light beam A having a polarization direction that is parallel to the equator from a predetermined position P0 located on the equator, the light beam is rotated by 130 (degrees) (360×5+130=1930 degrees) around the optical axis R1 (2θ1) as its center so as to be moved to P1 (on the equator) by the first wave plate 30 and is further rotated by 50 (degrees) (360×6+50=2110 (degrees) around the optical axis R2 (2θ2) as its center so as to arrive at P2 (on the equator) by the second wave plate 40. Accordingly, it is understood that the incident light beam becomes a linearly-polarized light beam B that is rotated by θ=90 (degrees) with respect to the linearly-polarized light beam A and is output from the ½ wave plate 20.

In other words, even in a case where the azimuths of optical axes and the phase differences of the first wave plate 30 and the second wave plate 40 are interchanged, similarly to the case shown in FIGS. 17A and 17B (FIG. 19), the phase difference is 180 (degrees), and it is understood that the wave plates serve as a ½ wave plate as a whole.

Figure 21A:
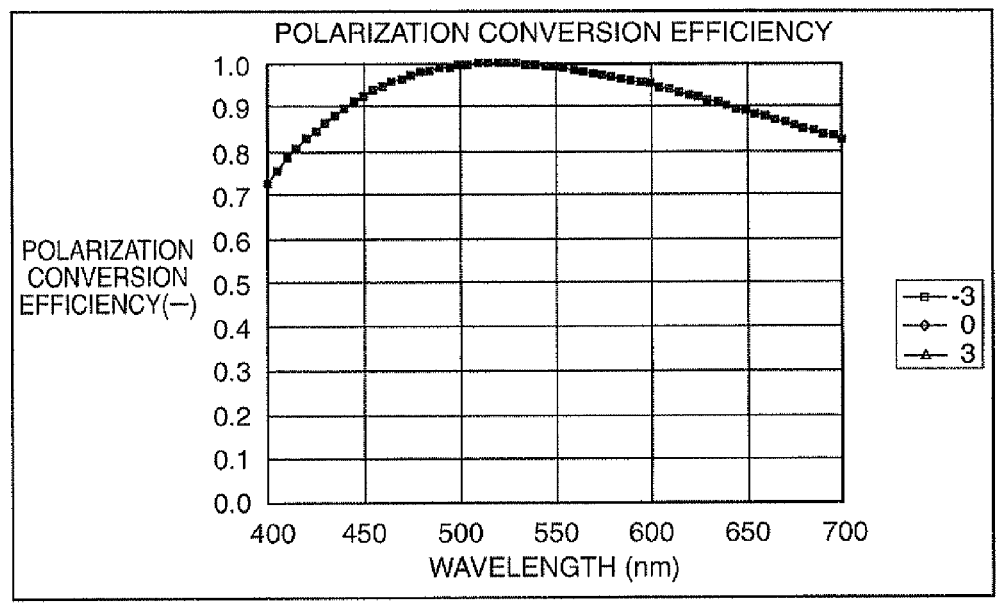
FIGS. 21A and 21B are diagrams showing the conversion efficiency of the laminated ½ wave plate for the range of 400 nm to 700 nm.
Figure 21B:
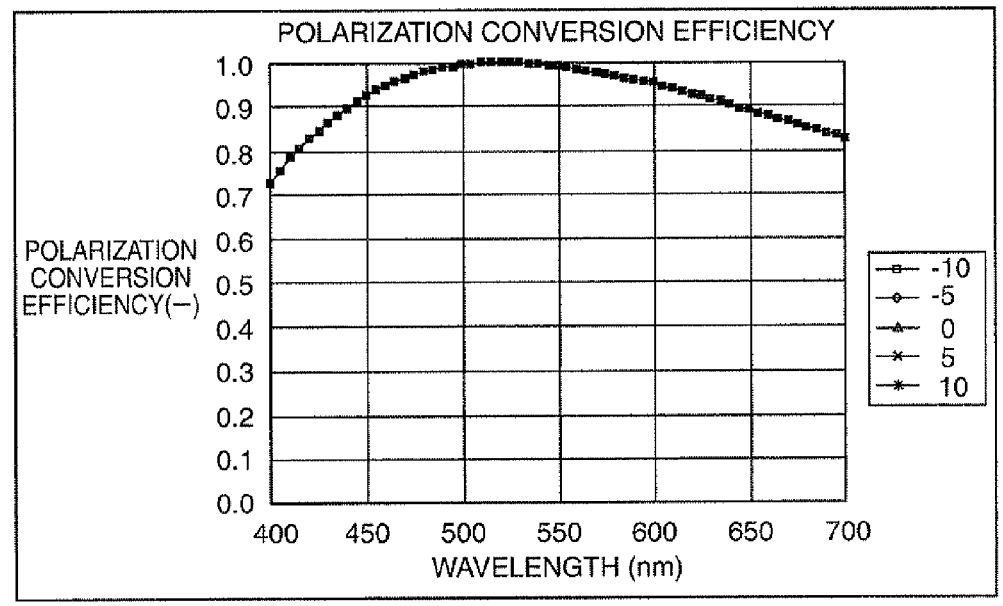

FIGS. 21A and 21B are diagrams showing the conversion efficiency of the laminated ½ wave plate 20 according to the embodiment of the invention for the wavelength range of 400 nm to 700 nm. FIG. 21A is a graph diagram showing changes in the polarization conversion efficiency for each wavelength in a case where the designed wavelength λ of each wave plate is 490 nm (G), and the incidence angle is changed from −3 (degrees) to +3 (degrees). FIG. 21B is a graph diagram showing changes in the polarization conversion efficiency for each wavelength in a case where the designed wavelength λ of each wave plate is 490 nm (G), and the incidence angle is changed from −10 (degrees) to +10 (degrees).

In any case, all the curves are in the state of approximately overlapping each other. Since the wavelengths of blue, green, and red used in a liquid crystal projector are a 400 nm band, a 500 nm band, and a 675 nm band, it was checked that the conversion efficiency of the laminated ½ wave plate 1 of the above-described parameters, even in a case where there is a deviation of ±10 in the incidence angle, was equal to or higher than 0.8 in the necessary wavelength band and was approximately 1.0 in the G band.

Figure 22A:
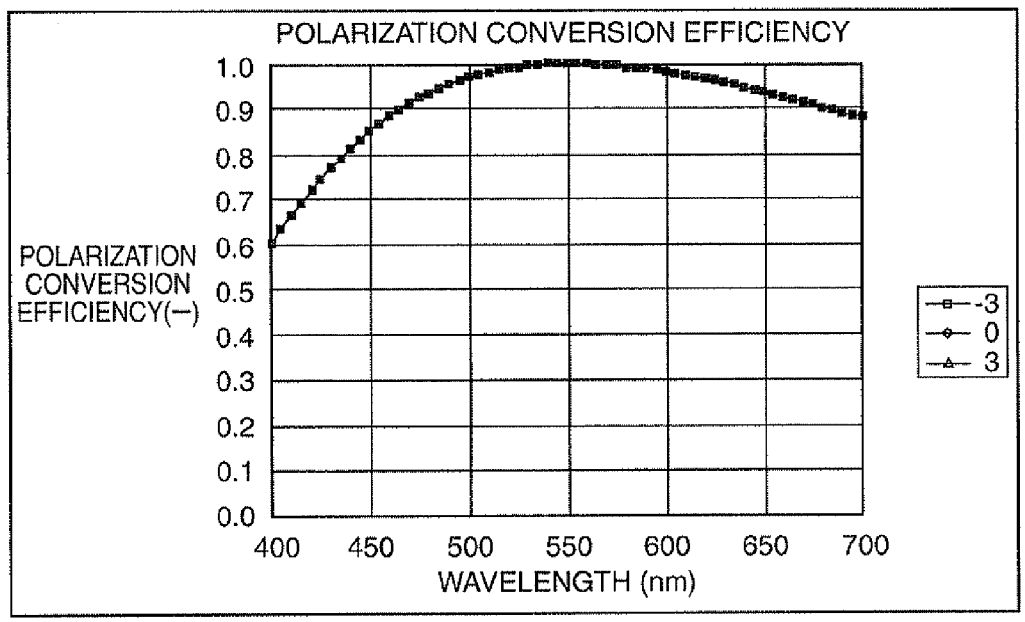
Figure 22B:
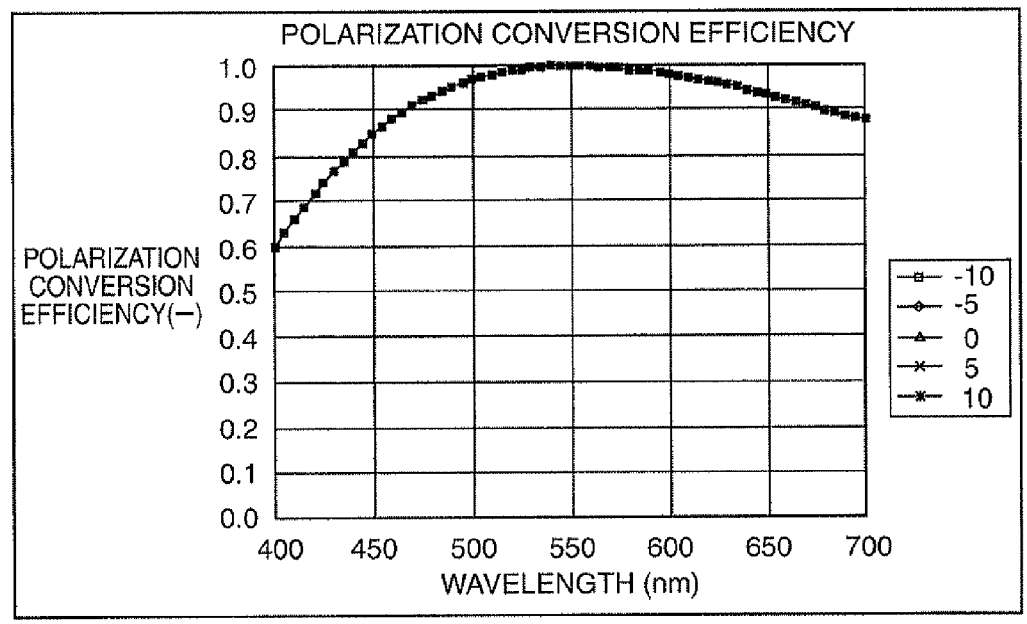

FIGS. 22A and 22B are diagrams showing the conversion efficiency of the laminated ½ wave plate 20 according to the embodiment of the invention for the wavelength range of 400 nm to 700 nm. FIG. 22A is a graph diagram showing changes in the polarization conversion efficiency for each wavelength in a case where the designed wavelength λ of each wave plate is 520 nm, and the incidence angle is changed from −3 (degrees) to +3 (degrees). FIG. 22B is a graph diagram showing changes in the polarization conversion efficiency for each wavelength in a case where the designed wavelength λ of each wave plate is 520 nm, and the incidence angle is changed from −10 (degrees) to +10 (degrees).

In any case, all the curves are in the state of approximately overlapping each other. Since the wavelengths of blue, green, and red used in a liquid crystal projector are a 400 nm band, a 500 nm band, and a 675 nm band, it was determined that the conversion efficiency of the laminated ½ wave plate 1 of the above-described parameters, even in a case where there is a deviation of ±10 (degrees) in the incidence angle, was equal to or higher than 0.8 in the necessary wavelength band and was approximately 1.0 in the G band.

Figure 23A:
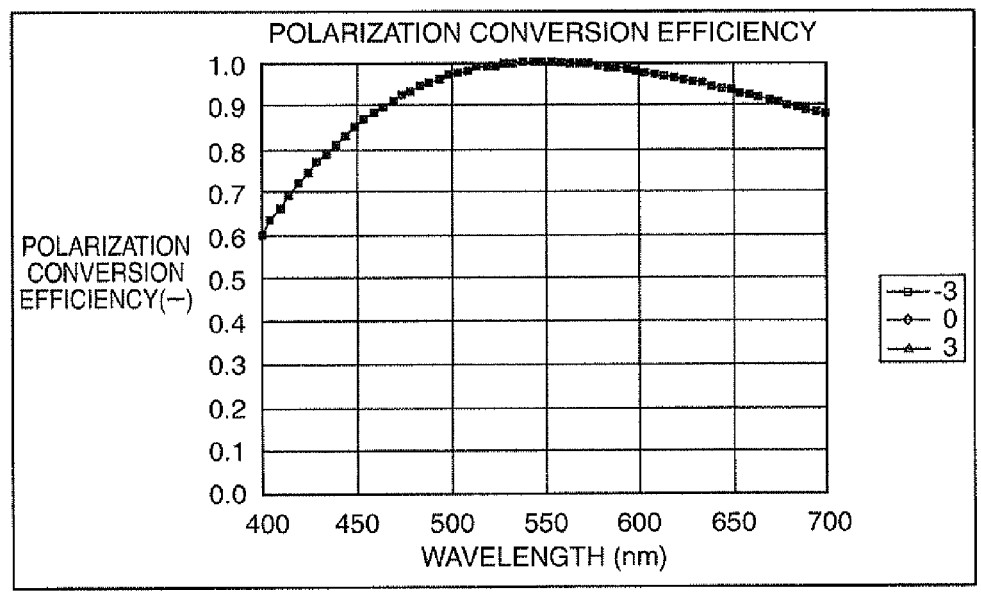
FIGS. 23A and 23B are diagrams showing the conversion efficiency of the laminated ½ wave plate for the range of 400 nm to 700 nm.
Figure 23B:
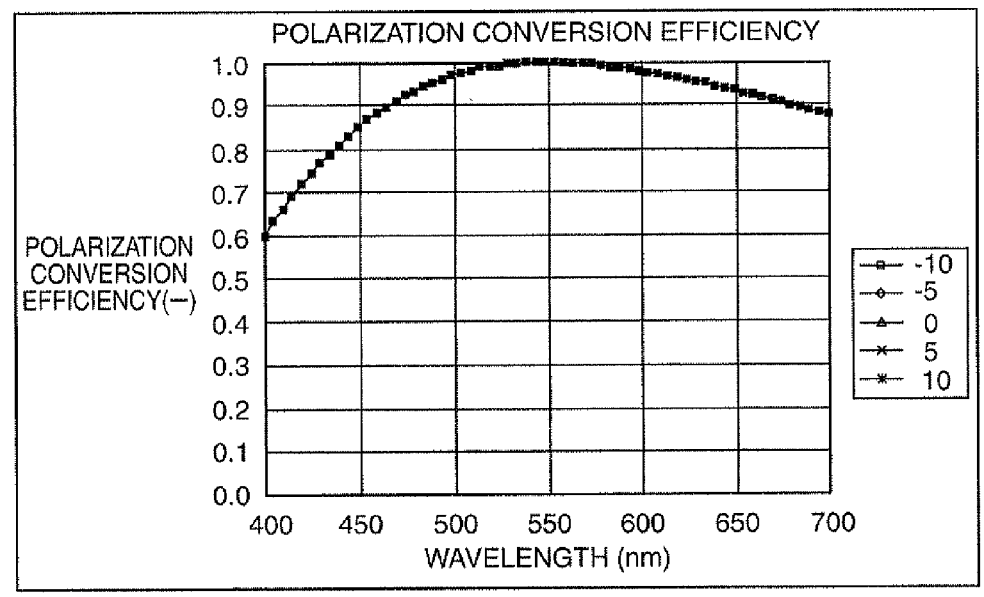

FIGS. 23A and 23B are diagrams showing the conversion efficiency of the laminated ½ wave plate 20 according to the embodiment of the invention for the wavelength range of 400 nm to 700 nm. FIG. 23A is a graph diagram showing changes in the polarization conversion efficiency for each wavelength in a case where the designed wavelength 2 of each wave plate is 550 nm, and the incidence angle is changed from −3 (degrees) to +3 (degrees) FIG. 23B is a graph diagram showing changes in the polarization conversion efficiency for each wavelength in a case where the designed wavelength λ of each wave plate is 550 nm, and the incidence angle is changed from −10 (degrees) to +10 (degrees).

In any case, all the curves are in the state of approximately overlapping each other. Since the wavelengths of blue, green, and red used in a liquid crystal projector are a 400 nm band, a 500 nm band, and a 675 nm band, it was determined that the conversion efficiency of the laminated ½ wave plate 1 of the above-described parameters, even in a case where there is a deviation of ±10 (degrees) in the incidence angle, was equal to or higher than 0.8 in the necessary wavelength band of 450 to 700 nm and was approximately 1.0 in the G band.

In addition, the wavelength band to which the laminated ½ wave plate responds may be not only RGB but also four wavelengths or five wavelengths acquired by adding the wavelength of another wavelength.

Figure 24C:
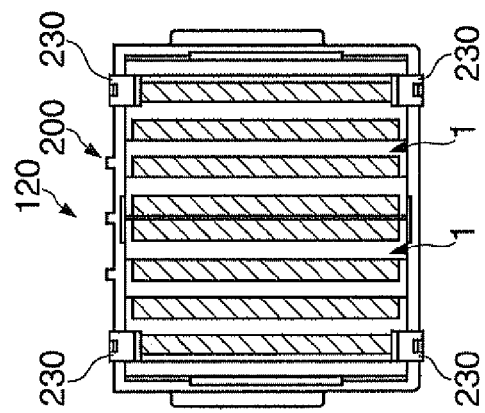
FIGS. 24A, 24B, and 24C are diagrams showing the external appearance of a polarization conversion unit in which the polarization conversion element according to the embodiment of the invention is built.
Figure 24B:
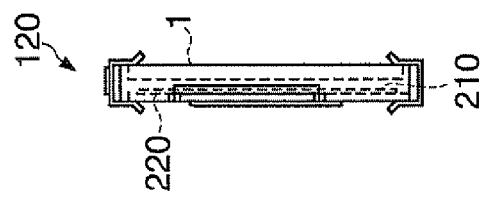
Figure 24A:
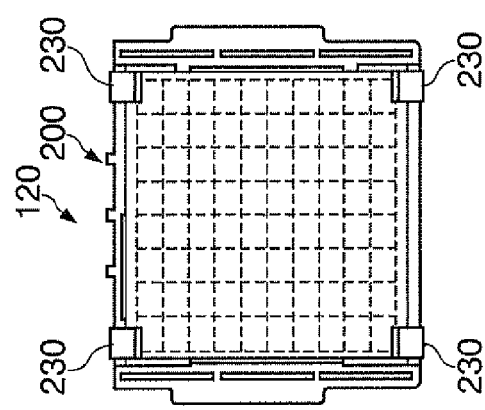

FIGS. 24A, 245, and 24C are diagrams showing the external appearance of a polarization conversion unit in which the polarization conversion element according to the embodiment of the invention is built.

FIG. 25 is an exploded perspective view of the polarization conversion unit shown in FIGS. 24A to 24C.

The polarization conversion unit 120 shown in FIGS. 23A, 23B, and 24A to 24C includes a unit frame 200, the polarization conversion element 1 according to the embodiment of the invention, a light shielding plate 210, a lens array 220, and clips 230. From one opening face (the lower face in FIG. 25) of the unit frame 200, a polarization conversion element 1 including two polarization conversion element main bodies to be described later is inserted, and from the other opening face (the upper face in FIG. 25), the light shielding plate 210 and the lens array 220 are inserted in the mentioned order. Such optical elements 210 and 220 are pinched by four clips 230 in the vertical two directions in a state in which the optical elements are housed in the unit frame 200. Since the clip 230 is formed from elastic bodies, it can be easily attached and detached, and each component of the polarization conversion unit 120 can be easily attached to or detached from the unit frame as well.

According to such a unit frame 200, a light beam emitted from a light source is incident to the polarization conversion element 1 (particularly, a PBS film to be described later) at a constant angle, and accordingly, the polarization conversion element 1 can be built in the liquid crystal projector in a posture in which PS conversion can be precisely performed.

Figure 26:
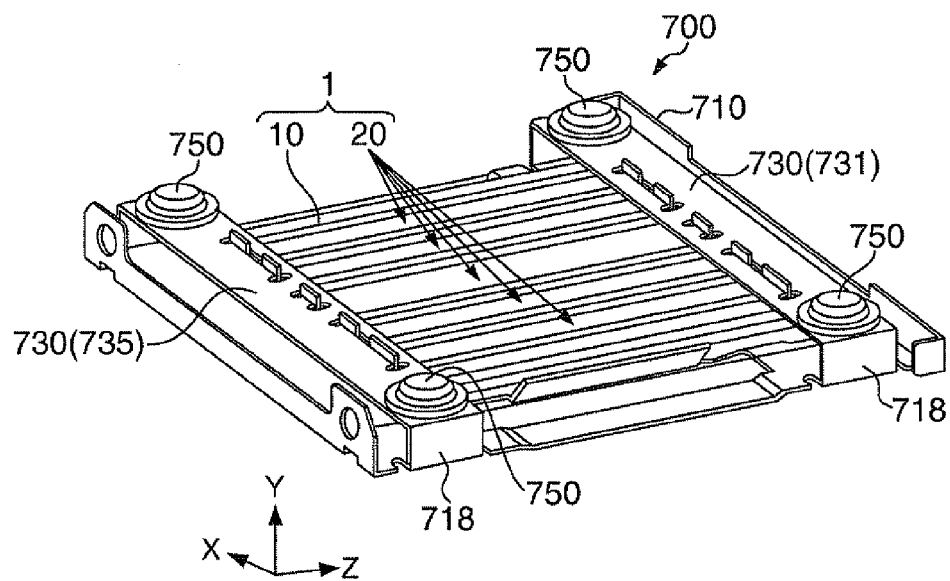
FIG. 26 is a diagram illustrating a method of fixing the polarization conversion element embodied as shown in FIGS. 5A and 5B.
Figure 27:
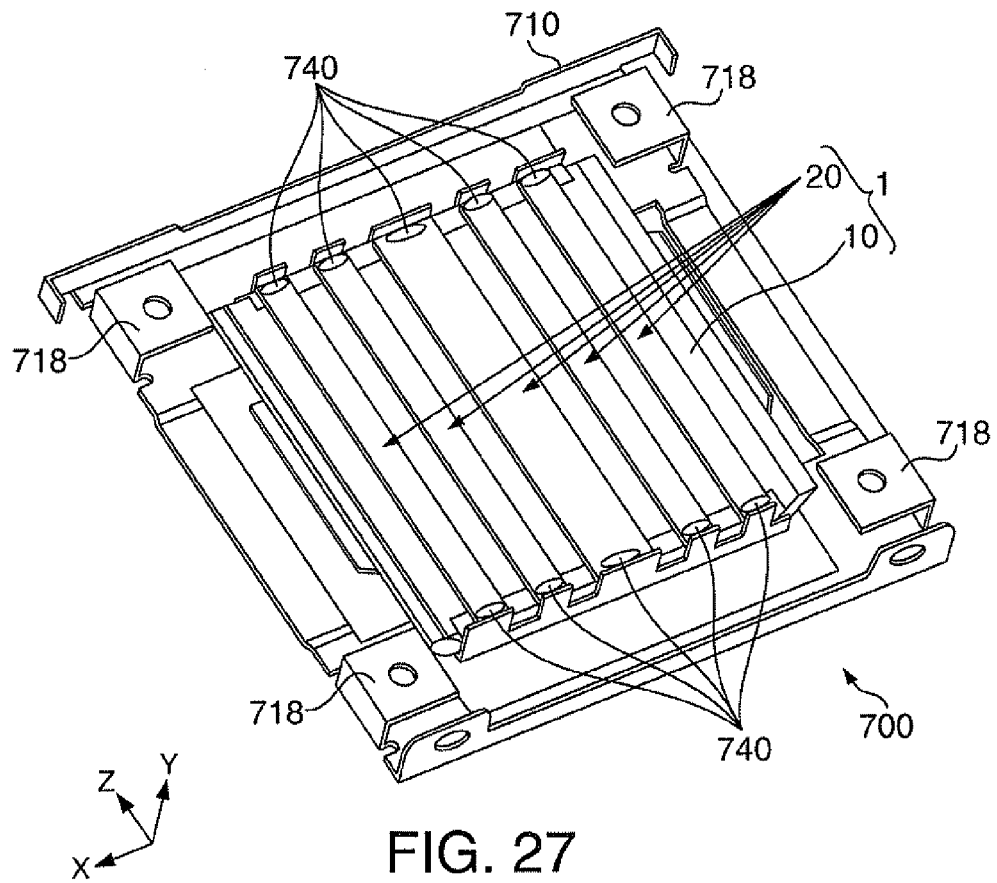
FIG. 27 is a diagram illustrating a method of fixing the polarization conversion element embodied as shown in FIGS. 5A and 5B.

FIGS. 26 and 27 are diagrams illustrating a method of fixing the polarization conversion element embodied as shown in FIGS. 5A and 5B.

FIGS. 26 and 27 are perspective views of the polarization conversion device when viewed from the light beam outgoing side.

The polarization conversion element 1 is housed (fixed) in a fixing frame 700 shown in FIG. 26.

The fixing frame 700 is configured by first fixing frames 710 and second fixing frames 730. The first fixing frames 710 are arranged on the light beam incident side of the polarization conversion element 1 (FIG. 27), and the second fixing frames 730 are arranged on the light beam outgoing side of the polarization conversion element 1 (FIG. 26).

The first fixing frame 710 forms a frame shape in an approximately rectangular shape in the plan view, and the element main body 10 of the polarization conversion element 1 is bonded and fixed to the inner face side thereof.

In addition, the second fixing frames 730 are arranged on both end portions of the phase difference plate 20 on the light beam outgoing side of the phase difference plate 20. In this embodiment, the second fixing frames 730 are configured as pressing plates 731 and 735 formed in a rectangular plate shape. In the description presented below, the second fixing frames 730 will be referred to as the pressing plates 731 and 735 as is appropriate.

Furthermore, the polarization conversion element 1 is configured to include a silicon adhesive 740 as an elastic member having elasticity. After the end portions of the phase difference plate 20 are coated with the silicon adhesive 740, the pressing plates 731 and 735 are placed in arm portions 718 formed in the first fixing frames 710 from the upper side that is coated with the silicon adhesive 740, and the polarization conversion element 1 is configured to be fixed to the arm portions 718 by using flange screws 750 (FIG. 26).

Figure 28:
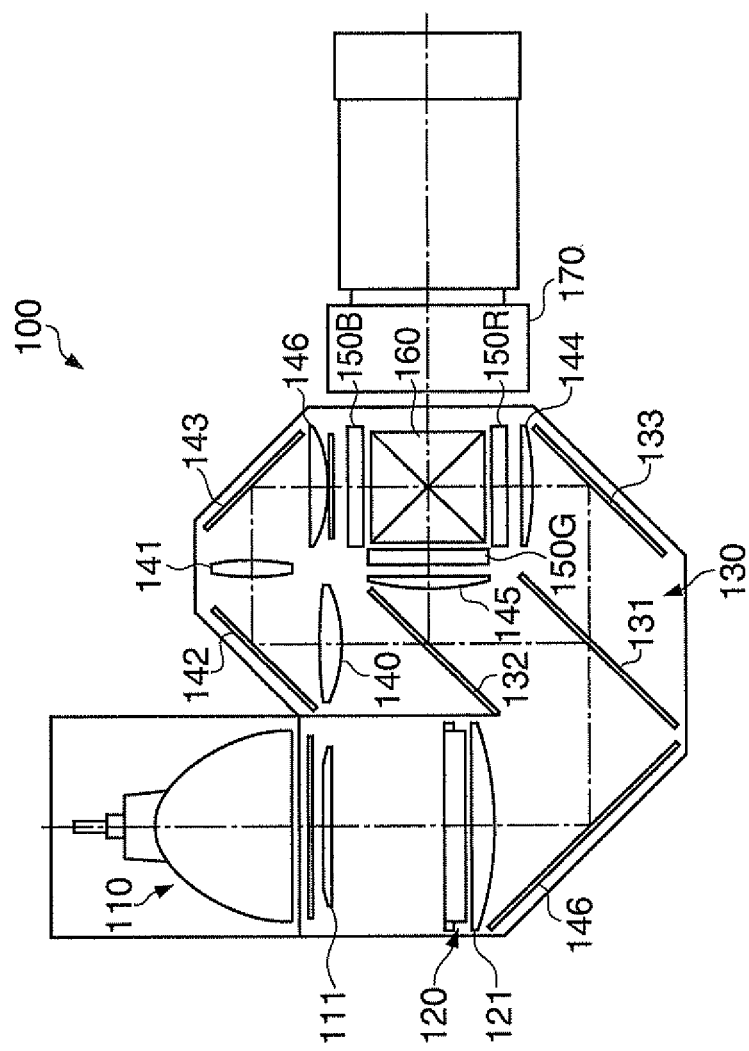
FIG. 28 is a diagram showing a liquid crystal projector as an example of a light projecting apparatus to which a polarization conversion element according to an embodiment of the invention is applied.
Figure 29:
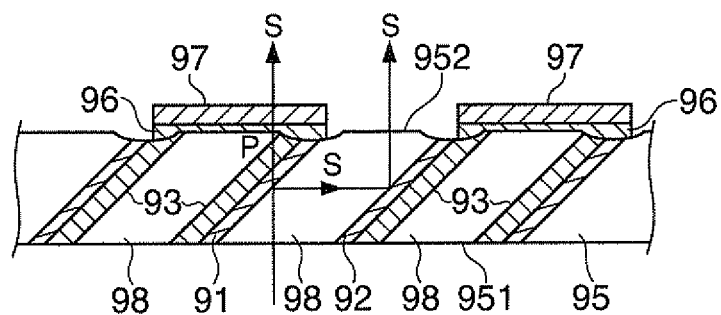
FIG. 29 is a diagram illustrating the configuration of a general polarization conversion element.
Figure 30:
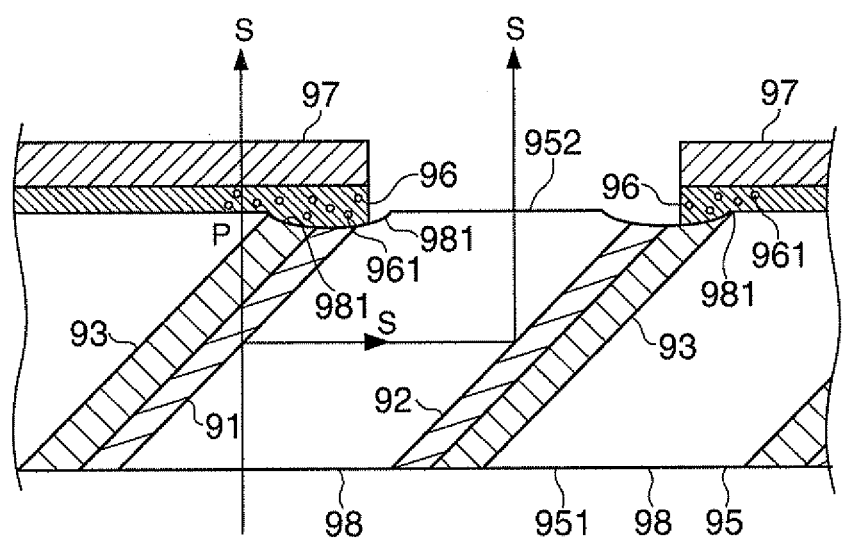
FIG. 30 is a diagram illustrating the configuration of a general polarization conversion element.

FIG. 28 is a diagram showing a liquid crystal projector as an example of a light projecting apparatus to which a polarization conversion element according to an embodiment of the invention is applied.

The projection-type display apparatus (liquid crystal projector) 100 shown in FIG. 28 includes an illumination optical system that is configured by a light source 110, a first lens array 111, a polarization conversion unit 120 in which the polarization conversion element according to the embodiment of the invention is built, and an overlapping lens 121. In addition, the projection-type display apparatus 100 includes a color light splitting optical system 130 that includes dichroic mirrors 131 and 132 and a reflective mirror 133. Furthermore, a light guiding optical system is included therein which includes an incident side lens 140, a relay lens 141, and reflective mirrors 142 and 143. In addition, the projection-type display apparatus 100 includes three field lenses 144, 145, and 146, three liquid crystal light valves 150R, 150G, and 150B, a cross dichroic prism 160, and a projection lens 170.

The reflective mirror 146 has a function of reflecting light output from the overlapping lens 121 in a direction of the color light splitting optical system 130. The color light splitting optical system 130 has a function of splitting light output from the overlapping lens 121 into three color light beams of red, green, and blue by using two dichroic mirrors 131 and 132. The first dichroic mirror 131 transmits a red light component out of light output from the overlapping lens 121 and reflects a blue light component and a green light component. The red light transmitted through the first dichroic mirror 131 is reflected by the reflective mirror 133, passes through the field lens 144, and arrives at a red light liquid crystal light value 150R. This field lens 144 converts partial light beams output from the overlapping lens 121 into light beams parallel to the center axis (main light beams). The field lenses 145 and 146 disposed before the other liquid crystal light valves operate similarly.

Out of blue light and green light reflected by the first dichroic mirror 131, the green light is reflected by the second dichroic mirror 132, passes through the field lens 145, and arrives at the green light liquid crystal light valve 150G. On the other hand, the blue light is transmitted through the second dichroic mirror 132, passes through the light guiding optical system, that is, the incident-side lens 140, the reflective mirror 142, the relay lens 141, and the reflective mirror 143, further passes through the field lens 146, and arrives at the blue light liquid crystal light valve 150B.

Here, the reason for using the light guiding optical system for the blue light is to prevent a decrease in the use efficiency of light due to diffusion of light and the like that is caused by the length of the optical path of the blue light that is longer than that of the other color light. In other words, the reason is for directly transmitting the light beam incident to the incident-side lens 140 to the field lens 146.

Three liquid crystal light valves 150R, 150G, and 150E have a function as an optical modulation unit that modulates incident light based on given image information (image signal). Accordingly, each color light incident to the three liquid crystal light valves 150R, 150G, and 150B is modulated based on given image information so as to form images of each color light.

The modulated light of three colors output from the three liquid crystal light valves 150R, 150G, and 150B is incident to the cross-dichroic prism 160.

The cross dichroic prism 160 has a function of forming a color image by composing modulated light of three colors as a color light composing unit. In the cross dichroic prism 160, a dielectric multi-layer film that reflects red light and a dielectric multi-layer film that reflects blue right are formed in an approximate "X" on the boundary face of four rectangular prisms. Through such dielectric multiple-layer film, modulated light of three colors is composed, and composite light used for projecting a color image is formed. The composed light generated by the cross-dichroic prism 160 is output in the direction of the projection lens 170. The projection lens 170 has a function of projecting the composed light onto a projection screen and displays a color image on the projection screen.

In addition, as will be described later, by building a polarization conversion unit including a polarization conversion element according to an embodiment of the invention, which has superior heat-resistance and light resistance, in a liquid crystal projector, the liquid crystal projector is acquired which can project a clear image for a long time by using a high-luminance and high-heat dissipating light source.

Furthermore, the polarization conversion element according to the embodiment of the invention includes a phase difference plate (laminated ½ wave plate) that reliably serves as a ½ wave plate for a plurality of mutually different wavelength bands, and accordingly, the liquid crystal projector can be realized which can project a clear image with high luminance.

The entire disclosure of Japanese Patent Application No. 2011-093779, filed Apr. 20, 2011 is expressly incorporated by reference herein.

What is claimed is:

1. A polarization conversion element that has a light incident face and a light outgoing face that are approximately parallel to each other, the polarization conversion element comprising:
   a plurality of light transmitting substrates that are joined together through an adhesive layer by a joining face having a predetermined tilt angle with respect to the light incident face or the light outgoing face;
   an optical element that is alternately disposed in boundary portions between the plurality of light transmitting substrates and includes polarization splitting portions that split light incident to the light incident face into two mutually-different types of linearly-polarized light beams of which polarization directions are perpendicular to each other, transmit one linearly-polarized light beam, and reflect the other linearly-polarized light beam and reflective portions that change a direction of an optical path by reflecting the other linearly-polarized light beam that is reflected; and
   a phase difference plate that is arranged on the light outgoing face, converts any one of the two types of linearly-polarized light beams into a linearly-polarized light beam parallel to a polarization plane of the other linearly-polarized light beam by rotating a polarization plane of the one linearly-polarized light beam, and outputs the converted linearly-polarized light beam,
   wherein the adhesive layer is an ultraviolet-curing type adhesive having a thickness equal to or larger than 5 μm and equal to or less than 10 μm,
   wherein the phase difference plate is a phase difference plate that is arranged in an area located above the polarization splitting portion or an area located above the reflective portion on the light outgoing face, is formed by stacking a first wave plate of a phase difference $\Gamma 1$ for light of wavelength $\lambda$ and a second wave plate of a phase difference $\Gamma 2$ for light of a wavelength $\lambda$ such that optical axes of the first and second wave plates intersect each other, converts an incident linearly-polarized light beam into a linearly-polarized light beam acquired by rotating the polarization plane of the incident linearly-polarized light beam by a rotation angle $\theta=90$ (degrees), and outputs the converted linearly-polarized light beam,
   wherein a relationship between the phase difference $\Gamma 1$ and the phase difference $\Gamma 2$ satisfies "$|\Gamma 1-\Gamma 2|=180$ (degrees)", and
   wherein an azimuth $\theta 1$ of the optical axis of the first wave plate and an azimuth $\theta 2$ of the optical axis of the second wave plate are perpendicular to each other and satisfy $\theta 1=45$ (degrees) and $\theta 2=135$ (degrees) or $\theta 1=135$ (degrees) and $\theta 2=45$ (degrees).

2. The polarization conversion element according to claim 1, wherein the phase difference plate includes:
   a base portion that is joined to an end edge portion of the optical element in a direction in which the polarization splitting portions and the reflective portions are alternately aligned; and
   a plurality of phase difference portion main bodies that are formed to be continuous from the base portion and are arranged on the light outgoing face side of the polarization splitting portion or the reflective portion.

3. The polarization conversion element according to claim 1, wherein the adhesive layer has modified acrylate or modified methacrylate as its main component.

4. The polarization conversion element according to claim 1,
   wherein the phase difference plate and the light outgoing face are joined together through a joining layer,
   wherein the joining layer includes Si frameworks having an atomic structure that includes a siloxane bond (Si—O) and a leaving group that is bound to the Si framework, and
   wherein, out of the Si frameworks, a free bond of the Si framework from which the leaving group departs becomes an active bond and joins the phase difference plate and the light outgoing face.

5. The polarization conversion element according to claim 1,
   wherein the light transmitting substrate and the phase difference plate are joined together through a joining layer, and
   wherein the joining layer is formed by using an atomic diffusion joining method in which atomic diffusion is caused on a contact boundary face and a grain boundary of a microcrystalline continuous thin film of the light transmitting substrate and a microcrystalline continuous thin film of the phase difference plate by bringing the microcrystalline continuous thin film disposed on the light transmitting substrate and the microcrystalline continuous thin film disposed on the phase difference plate into contact with each other or an atomic diffusion joining method in which atomic diffusion is caused on a contact boundary face and a grain boundary of a microcrystalline continuous thin film and a microcrystalline structure by bringing the microcrystalline continuous thin film disposed on one of the light transmitting substrate and the phase difference plate and the microcrystalline structure disposed on the other into contact with each other.

6. The polarization conversion element according to claim 1, wherein a material of the phase difference plate is an inorganic optical crystal.

7. A polarization conversion unit comprising:
   the polarization conversion element according to claim 1; and
   a fixing frame that fixes the polarization conversion element.

8. A polarization conversion unit comprising:
   the polarization conversion element according to claim 2; and
   a fixing frame that fixes the polarization conversion element.

9. A polarization conversion unit comprising:
   the polarization conversion element according to claim 3; and a fixing frame that fixes the polarization conversion element.

10. A polarization conversion unit comprising:
the polarization conversion element according to claim 4; and
a fixing frame that fixes the polarization conversion element.

11. A polarization conversion unit comprising:
the polarization conversion element according to claim 5; and
a fixing frame that fixes the polarization conversion element.

12. A polarization conversion unit comprising:
the polarization conversion element according to claim 6; and
a fixing frame that fixes the polarization conversion element.

13. A projection apparatus comprising:
a light source device that emits light;
the polarization conversion unit according to claim 7 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

14. A projection apparatus comprising:
a light source device that emits light;
the polarization conversion unit according to claim 8 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

15. A projection apparatus comprising:
a light source device that emits light;
the polarization conversion unit according to claim 9 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

16. A projection apparatus comprising:
a light source device that emits light;
the polarization conversion unit according to claim 10 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

17. A projection apparatus comprising:
a light source device that emits light;
the polarization conversion unit according to claim 11 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

18. A projection apparatus comprising:
a light source device that emits light;
the polarization conversion unit according to claim 12 that converts light emitted from the light source device into one type of polarized light beam;
an optical modulation device that forms an optical image in correspondence with image information using the polarized light beam output from the polarization conversion unit; and
a projection optical device that projects the optical image formed by the optical modulation device in an enlarged scale.

* * * * *